(12) United States Patent
Itoh

(10) Patent No.: US 10,547,763 B2
(45) Date of Patent: Jan. 28, 2020

(54) IMAGE FORMING APPARATUS, IMAGE FORMING METHOD, AND STORAGE MEDIUM

(71) Applicant: CANON KABUSHIKI KAISHA, Tokyo (JP)

(72) Inventor: Isami Itoh, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/360,365

(22) Filed: Mar. 21, 2019

(65) Prior Publication Data

US 2019/0306370 A1 Oct. 3, 2019

(30) Foreign Application Priority Data

Mar. 27, 2018 (JP) .................... 2018-060902

(51) Int. Cl.
*H04N 1/405* (2006.01)
*H04N 1/52* (2006.01)

(52) U.S. Cl.
CPC ............ *H04N 1/4058* (2013.01); *H04N 1/52* (2013.01)

(58) Field of Classification Search
None
See application file for complete search history.

(56) References Cited

U.S. PATENT DOCUMENTS

| | | | |
|---|---|---|---|
| 5,766,807 A | 6/1998 | Delabastita et al. | 430/6 |
| 9,734,439 B2* | 8/2017 | Hara | G06K 15/1881 |
| 2006/0181739 A1* | 8/2006 | Yamakado | H04N 1/4057 358/3.13 |
| 2006/0290989 A1* | 12/2006 | Kobayashi | H04N 1/4053 358/3.03 |
| 2009/0161165 A1* | 6/2009 | Fujimoto | G06K 15/107 358/2.1 |
| 2010/0245444 A1* | 9/2010 | Asai | B41J 2/2054 347/15 |
| 2011/0032574 A1* | 2/2011 | Kakutani | B41J 2/2128 358/3.14 |
| 2013/0250364 A1* | 9/2013 | Nakagawa | B41J 2/2132 358/3.13 |
| 2014/0285851 A1* | 9/2014 | Kawamoto | G06K 15/1881 358/3.09 |
| 2019/0014232 A1* | 1/2019 | Haruta | H04N 1/4052 |

FOREIGN PATENT DOCUMENTS

JP H08-305005 11/1996

\* cited by examiner

*Primary Examiner* — Dung D Tran
(74) *Attorney, Agent, or Firm* — Venable LLP

(57) ABSTRACT

An image forming apparatus comprises an output unit to output output data converted from input data by a halftone process with a first or second matrix in accordance with attribute information on pixels of the input data. The thresholds in the first matrix, whose thresholds are arranged to express the tone level of output data by the number of dots or dot area modulation for input data, and the second matrix, whose thresholds are arranged to express the tone level of output data by dot area modulation for the input data, are arranged such that the average dot size of output data obtained by the halftone process with the second matrix on input data with the first density is smaller than the average dot size of output data obtained by the halftone process with the first matrix on the input data with the first density.

16 Claims, 24 Drawing Sheets

| 92 | 56 | 40 | 76 | 96 | 94 | 58 | 42 | 78 | 98 |
|---|---|---|---|---|---|---|---|---|---|
| 72 | 28 | 12 | 32 | 80 | 74 | 30 | 14 | 34 | 82 |
| 44 | 8 | 0 | 16 | 48 | 46 | 10 | 2 | 18 | 50 |
| 60 | 20 | 4 | 24 | 68 | 62 | 22 | 6 | 26 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 15 | 35 | 83 | 73 | 29 | 13 | 33 | 81 |
| 47 | 11 | 3 | 19 | 51 | 45 | 9 | 1 | 17 | 49 |
| 63 | 23 | 7 | 27 | 71 | 61 | 21 | 5 | 25 | 69 |
| 87 | 55 | 39 | 67 | 91 | 85 | 53 | 37 | 65 | 89 |

FIG.16A

| 92 | 56 | 40 | 76 | 96 | 94 | 58 | 42 | 78 | 98 |
|---|---|---|---|---|---|---|---|---|---|
| 72 | 28 | 3 | 32 | 80 | 74 | 30 | 17 | 34 | 82 |
| 44 | 2 | 0 | 4 | 48 | 46 | 16 | 14 | 18 | 50 |
| 60 | 5 | 1 | 6 | 68 | 62 | 19 | 15 | 20 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 24 | 35 | 83 | 73 | 29 | 10 | 33 | 81 |
| 47 | 23 | 21 | 25 | 51 | 45 | 9 | 7 | 11 | 49 |
| 63 | 26 | 22 | 27 | 71 | 61 | 12 | 8 | 13 | 69 |
| 87 | 55 | 39 | 67 | 91 | 85 | 53 | 37 | 65 | 89 |

FIG.16B

| 92 | 56 | 40 | 76 | 96 | 94 | 58 | 42 | 78 | 98 |
|---|---|---|---|---|---|---|---|---|---|
| 72 | 28 | 12 | 32 | 80 | 74 | 30 | 14 | 34 | 82 |
| 44 | 8 | 0 | 16 | 48 | 46 | 10 | 2 | 18 | 50 |
| 60 | 20 | 4 | 24 | 68 | 62 | 22 | 6 | 26 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 15 | 35 | 83 | 73 | 29 | 13 | 33 | 81 |
| 47 | 11 | 3 | 19 | 51 | 45 | 9 | 1 | 17 | 49 |
| 63 | 23 | 7 | 27 | 71 | 61 | 21 | 5 | 25 | 69 |
| 87 | 55 | 39 | 67 | 91 | 85 | 53 | 37 | 65 | 89 |

FIG.17A

| 92 | 56 | 40 | 76 | 96 | 94 | 58 | 42 | 78 | 98 |
|---|---|---|---|---|---|---|---|---|---|
| 72 | 28 | 3 | 32 | 80 | 74 | 30 | 13 | 34 | 82 |
| 44 | 2 | 0 | 4 | 48 | 46 | 12 | 10 | 14 | 50 |
| 60 | 20 | 1 | 24 | 68 | 62 | 22 | 11 | 26 | 70 |
| 84 | 52 | 36 | 64 | 88 | 86 | 54 | 38 | 66 | 90 |
| 95 | 59 | 43 | 79 | 99 | 93 | 57 | 41 | 77 | 97 |
| 75 | 31 | 18 | 35 | 83 | 73 | 29 | 8 | 33 | 81 |
| 47 | 17 | 15 | 19 | 51 | 45 | 7 | 5 | 9 | 49 |
| 63 | 23 | 16 | 27 | 71 | 61 | 12 | 6 | 25 | 69 |
| 87 | 55 | 39 | 67 | 91 | 85 | 53 | 37 | 65 | 89 |

FIG.17B

|  | ROUGHNESS (NOISE) | FALSE CONTOUR | LIKELIHOOD FOR DOTS TO BE UNNOTICEABLE |
|---|---|---|---|
| SCREEN A | × | × | ○ |
| SCREEN B | × | △ | ○ |
| SCREEN C | ○ | ○ | ○ |
| SCREEN D | ○ | ○ | ○ |
| SCREEN E | ○ | ○ | △ |
| SCREEN F | ○ | ○ | △ |

FIG.19

USING DIFFERENT SCREENS FOR IMAGE REGION AND TEXT REGION

USING SAME SCREEN FOR IMAGE REGION AND TEXT REGION

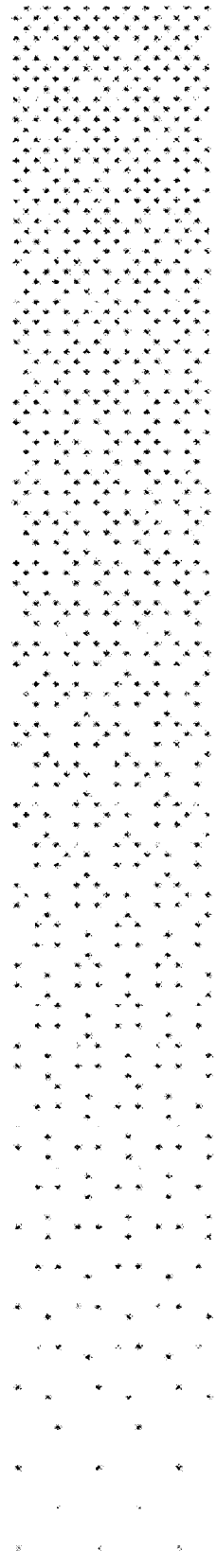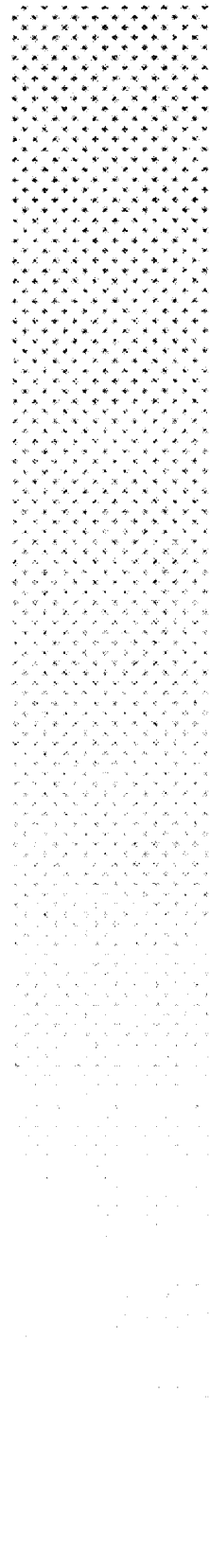
FIG.21A DOT CONCENTRATION TYPE (WITH SPECIFIED MINIMUM DOT SIZE)
FIG.21B NON-DOT CONCENTRATION TYPE

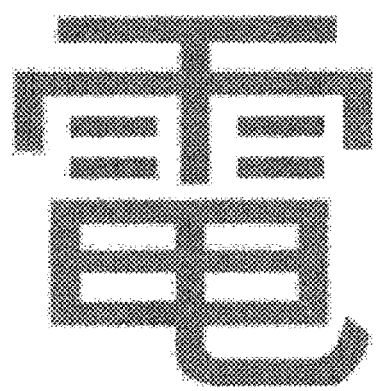
INPUT DATA
DITHER PROCESSING
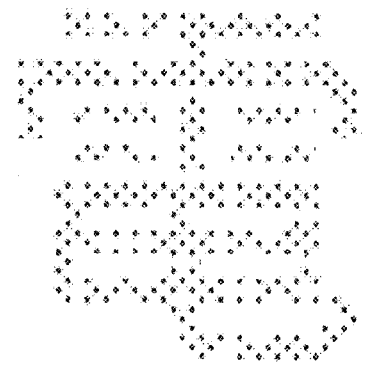
HALFTONE CHARACTER (A)
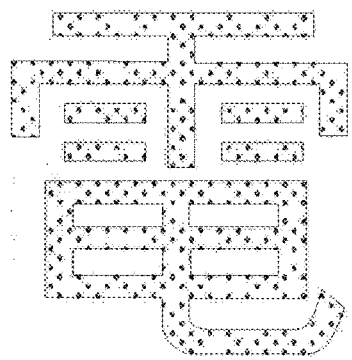
HALFTONE CHARACTER (B)
FIG.22

IMAGE FORMING APPARATUS, IMAGE FORMING METHOD, AND STORAGE MEDIUM

BACKGROUND OF THE INVENTION

Field of the Invention

The present invention relates to an image forming apparatus, an image forming method, and a storage medium.

Description of the Related Art

Heretofore, to reproduce halftones in images, electrophotographic image forming apparatuses have generally employed a method using a halftone process such as amplitude modulation (AM) screening to reproduce tones. The machine's type and operating environment, the number of sheets used, and so on change the halftone reproducibility. Thus, gamma correction is performed to ensure certain tone reproducibility. However, although the tone reproducibility is improved by performing gamma correction, there is a problem that the reproduction of highlight regions with halftone dots or lines is unstable and that may be noticed as noise.

Thus, various measures have been taken to achieve more accurate halftone dot reproduction. For example, Japanese Patent Laid Open No. H08-305005 proposes a method using at least two modulation methods for halftone dot reproduction.

However, electrophotographic image forming apparatuses employing the method in Japanese Patent Laid Open No. H08-305005 may form images with missing dots, broken dots, or the like depending on their use condition, although the tones are expressed using frequency modulation. Such apparatuses may also form images with poor graininess.

For example, in conventional screen switching based on attribute information, the number of lines for each color is different between tone and resolution screens. Then, in a case where an image region contains a halftone character, the image may be such that the character's edge appears white due to color misregistration or the like. Also, the image may be such that colors are mixed or the image may contain jaggies.

To avoid such images, one may consider eliminating image-region separation and performing reproduction only with a resolution screen. However, doing so may result in an image with deteriorated halftone reproducibility and stability in highlight regions.

SUMMARY OF THE INVENTION

An image forming apparatus according to an aspect of the present invention is an image forming apparatus that performs image formation by transferring and fixing an image formed on an image carrier onto a sheet, comprising: a memory storing a first threshold matrix and a second threshold matrix for executing a halftone process that converts multi-tone input image data into output image data containing a smaller number of tones than the first input image data; and a controller unit including a processor or a hardware circuit configured to execute a program, wherein the controller unit functions as an output unit configured to output output image data obtained by the halftone process with the first threshold matrix in a case where attribute information associated with pixels of the input image data is a first type, and to output output image data obtained by the halftone process with the second threshold matrix in a case where the attribute information associated with the pixels of the input image data is a second type, wherein in the first threshold matrix, thresholds are arranged to express a tone level of output image data by means of the number of dots of a first size for input image data with a first density and also thresholds are arranged to express a tone level of output image data by means of dot area modulation for input image data with a second density higher than the first density, wherein in the second threshold matrix, thresholds are arranged to express a tone level of output image data by means of dot area modulation for both input image data with the first density and input image data with the second density, and wherein the thresholds in the first threshold matrix and the second threshold matrix are arranged such that an average dot size of output image data obtained by performing the halftone process with the second threshold matrix on input image data with the first density is smaller than an average dot size of output image data obtained by performing the halftone process with the first threshold matrix on the input image data with the first density.

Further features of the present invention will become apparent from the following description of exemplary embodiments with reference to the attached drawings.

BRIEF DESCRIPTION OF THE DRAWINGS

FIG. 16A is a diagram illustrating an example of a threshold matrix for usual AM screening tone reproduction in a case where the minimum dot size is seven dots;

FIG. 16B is a diagram illustrating an example of a threshold matrix for screening tone reproduction according to the embodiment in the case where the minimum dot size is seven dots;

FIG. 17A is a diagram illustrating an example of a threshold matrix for usual AM screening tone reproduction in a case where the minimum dot size is five dots;

FIG. 17B is a diagram illustrating an example of a threshold matrix for the screening tone reproduction according to the embodiment in the case where the minimum dot size is five dots;

FIG. 19 is a diagram illustrating an example of the result of evaluation on images with different minimum dot sizes in the embodiment;

FIG. 21A and FIG. 21B are diagrams illustrating an example of a dithered pattern for highlight with a dot concentration-type screen with a specified minimum dot size and an example of a dithered pattern for highlight with a non-dot concentration-type screen;

FIG. 22 is a diagram illustrating examples of images obtained by expressing a halftone character with a dot concentration-type screen with a specified minimum dot size;

DESCRIPTION OF THE EMBODIMENTS

An embodiment of the present invention will be described below with reference to the drawings. Note that the following embodiment does not limit the present invention, and not all the combinations of the features described in this embodiment are necessarily essential for a solution provided by the present invention.

This embodiment will be described by taking as an example an image forming apparatus having an electrophotographic color printing function using toners of four colors of C, M, Y, and K. However, image forming apparatuses to which the present invention is applicable are not limited to such image forming apparatuses. The present invention is applicable also to image forming apparatuses having a monochrome printing function and image forming apparatuses employing other printing methods such as an inkjet printing method.

<Configuration of Image Forming Apparatus>

Figure 1:
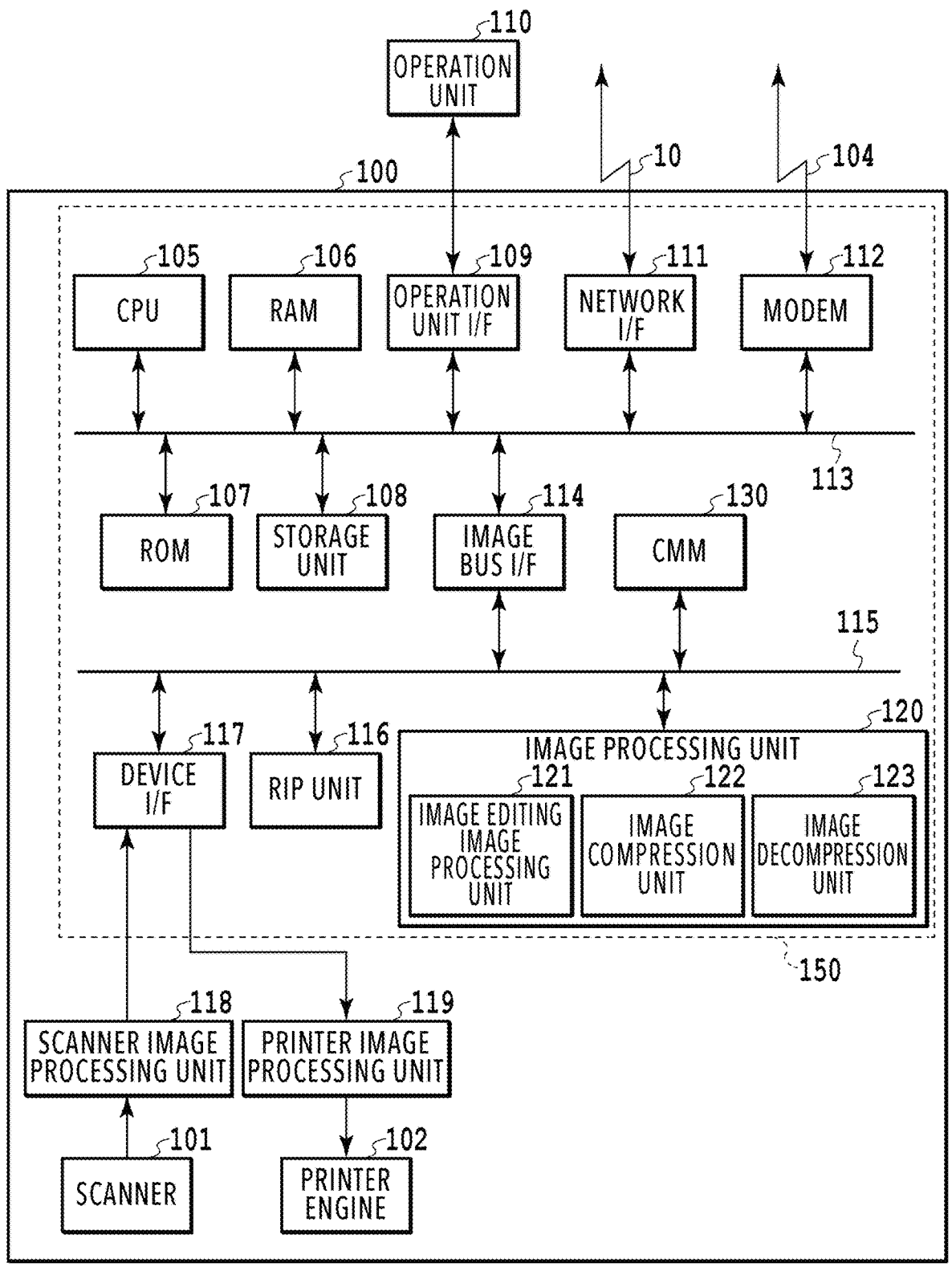
FIG. 1 is a block diagram illustrating the configuration of an image forming apparatus according to an embodiment.

FIG. 1 is a block diagram explaining the configuration of an image forming apparatus 100 according to this embodiment.

The image forming apparatus 100 includes a scanner 101, which is an image input device, a printer engine 102, which is an image output device, and a controller 150 which controls the scanner 101 and the printer engine 102. The scanner 101 is connected to a device interface (I/F) 117 in the controller 150 through a scanner image processing unit 118. The printer engine 102 is connected to the device I/F 117 of the controller 150 through a printer image processing unit 119. The scanner image processing unit 118 and the printer image processing unit 119 perform image processing for reading image data and outputting image data for printing. Also, the image forming apparatus 100 is connected to a local area network (LAN) 10 and a public line 104 and receives and transmits image information and device information through the LAN 10 and the public line 104.

Next, details of the controller 150 will be described. As illustrated in FIG. 1, the controller 150 is constituted of the units to be described below.

A central processing unit (CPU) 105 is a unit for controlling the operation of this image forming apparatus 100. The CPU 105 controls the entire controller 150 by using a program and data stored in a random access memory (RAM) 106 or a read only memory (ROM) 107. The RAM 106 provides a system work memory for the operation of the CPU 105 and further functions as an image memory for temporarily storing inputted image data. The ROM 107 is a boot ROM and stores a boot program. A storage unit 108 is a storage apparatus such as a hard disk drive (HDD) and stores system software for various processes, inputted image data, and so on. The CPU 105 executes the boot program in the ROM 107 to deploy a program and an OS stored in the storage unit 108 to the RAM 106, and executes the deployed program to control the operation of the image forming apparatus 100.

An operation unit I/F 109 is an interface unit for an operation unit 110 including a display screen capable of displaying image data and the like, and outputs operation screen data and the like to the operation unit 110. The operation unit I/F 109 also serves to notify the CPU 105 of information inputted by the user through the operation unit 110. A network I/F 111 is implemented with an LAN card or the like, for example, and is connected to the LAN 10 and receives and transmits information from and to an external apparatus (not illustrated). Also, a modem 112 is connected to the public line 104 and receives and transmits information from and to an external apparatus (not illustrated). The CPU 105, the RAM 106, the ROM 107, the storage unit 108, the operation unit I/F 109, the network I/F 111, and the modem 112 are connected to each other through a system bus 113.

An image bus I/F 114 is an interface unit connecting the system bus 113 and an image bus 115 that transfers image data at high speed, and functions as a bus bridge that converts a data structure into another. To the image bus 115 are connected a raster image processor (RIP) unit 116, the device I/F 117, an image processing unit 120, and a color management module (CMM) 130.

The RIP unit 116 translates page description language (PDL) code into image data. The device I/F 117 is connected to the scanner 101 through the scanner image processing unit 118 and connected to the printer engine 102 through the printer image processing unit 119, and converts image data in a synchronous manner or in a non-synchronous manner. Also, the scanner image processing unit 118 performs various processes such as correction and editing on image data inputted from the scanner 101.

The image processing unit 120 includes an image editing image processing unit 121, an image compression unit 122, and an image decompression unit 123. The image editing image processing unit 121 performs various types of image processing such as rotation, color processing, two-level conversion, and multi-level conversion on image data. The image compression unit 122 encodes image data processed by the RIP unit 116, the scanner image processing unit 118, and/or the image editing image processing unit 121 in a predetermined compression format in a case of temporarily storing it in the storage unit 108. In a case where image data stored compressed in the storage unit 108 is to be processed by the image editing image processing unit 121 and the printer image processing unit 119 and output to the printer engine 102, the image decompression unit 123 decodes and decompresses the encoded compressed data.

The printer image processing unit 119 performs image processing, correction, and so on suitable for the printer engine 102 on image data to be output for printing. The CMM 130 is a dedicated hardware module that performs a color conversion process (also referred to as color space conversion process) based on a profile and calibration data on image data. Here, the profile is information such as a function for converting color image data expressed in a device-dependent color space into a non-device-dependent color space (such as the Lab color space, for example). The calibration data is data for correcting color reproduction characteristics of the scanner 101 and the printer engine 102.

Here, a process performed by the controller 150 upon receiving print data will be described.

Upon receiving print data, the controller 150 performs rasterization on the basis of the print data and generates pixel-by-pixel image data and attribute information (attribute data). The print data has a grayscale or a color space with a plurality of color components such as RGB or CMYK. Each pixel in the image data has an 8-bit (256-level) value for each single color component. Also, the attribute information holds values representing attributes such as character, line (vector), figure, and image of objects in the image data, and is handled within the image processing unit 120 along with the image data.

<Software Module>

Figure 2:
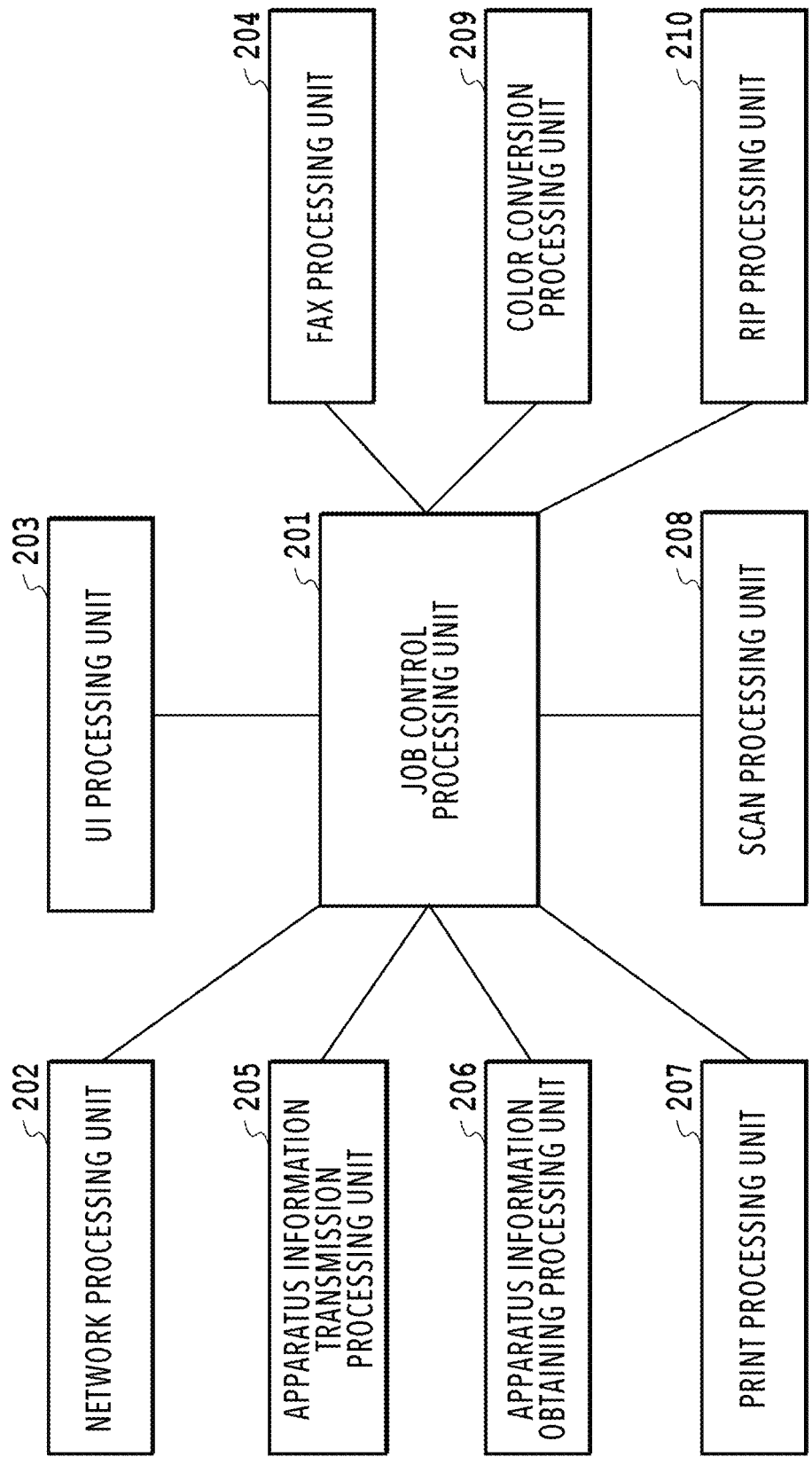
FIG. 2 is a diagram illustrating the software module configuration of the image forming apparatus.

FIG. 2 is a diagram illustrating the software module configuration of the image forming apparatus 100. The CPU 105 implements each module in FIG. 2 by deploying a program stored in the storage unit 108 to the RAM 106 and executing the deployed program.

A job control processing unit 201 manages and controls software modules illustrated and not illustrated and controls all jobs that occur within the image forming apparatus 100, such as photocopying, printing, scanning, and transmitting or receiving a fax.

A network processing unit 202 is a module that mainly controls communications with external apparatuses performed through the network I/F 111. It controls communications with apparatuses on the LAN 10. For example, upon receipt of a control command or data from an apparatus through the LAN 10, the network processing unit 202 notifies the job control processing unit 201 of its content. Also, based on an instruction from the job control processing unit 201, the network processing unit 202 transmits a control command or data to an apparatus(es) through the LAN 10.

A user interface (UI) processing unit 203 mainly performs control associated with the operation unit 110 and the operation unit I/F 109. The UI processing unit 203 transmits information which the user inputted by operating the operation unit 110 to the job control processing unit 201, and displays a content corresponding to an instruction from the job control processing unit 201 on the operation unit 110. The UI processing unit 203 also performs editing of graphic data to be displayed on the operation unit 110, and so on.

A fax processing unit 204 controls the fax function. The fax processing unit 204 receives and transmits faxes through the modem 112.

An apparatus information transmission processing unit 205 transmits apparatus information associated with image formation. An apparatus information obtaining processing unit 206 obtains apparatus information associated with image formation.

A print processing unit 207 controls the image editing image processing unit 121, the printer image processing unit 119, and the printer engine 102 on the basis of an instruction from the job control processing unit 201 to thereby print a specified image. The print processing unit 207 receives image data and information such as image information (the size, color mode, resolution, etc. of the image data) from the job control processing unit 201. The print processing unit 207 also receives information such as layout information (offset, magnification/reduction, imposition, etc.) and output sheet information (size, print direction, etc.). Moreover, the print processing unit 207 controls the image editing image processing unit 121, the image compression unit 122, the image decompression unit 123, and the printer image processing unit 119 to perform suitable image processing on image data. Then, the print processing unit 207 controls the printer engine 102 to print the image data subjected to the image processing onto a printing sheet, which is a printing material.

A scan processing unit 208 controls the scanner 101 and the scanner image processing unit 118 on the basis of an instruction from the job control processing unit 201 to thereby execute a scan, which is a process of scanning a document on the platen of the scanner 101. Then, the scan processing unit 208 inputs image data of the scanned document. The job control processing unit 201 is notified of color information of the input image data. Further, the scan processing unit 208 performs suitable image processing such as compression on the image data input by controlling the scanner image processing unit 118, and then notifies the job control processing unit 201 of the image data subjected to the image processing.

A color conversion processing unit 209 performs a color conversion process on specified image data on the basis of an instruction from the job control processing unit 201, and notifies the job control processing unit 201 of the image data subjected to the color conversion process.

An RIP processing unit 210 performs PDL interpretation on the basis of an instruction from the job control processing unit 201, and controls the RIP unit 116 to perform rendering for translation into an bitmap image.

With the above configuration, the image forming apparatus 100 performs a print operation on the basis of a print job received through the LAN 10. Next, description will be given of a print operation performed on the basis of a received print job in the image forming apparatus 100 with the above configuration.

First, as described above, PDL data transmitted from an external apparatus through the LAN 10 is received by the network I/F 111 and inputted into the RIP unit 116 through the image bus I/F 114. The RIP unit 116 interprets the received PDL data and converts it into code data that can be processed by the RIP unit 116. The RIP unit 116 then executes rendering on the basis of the converted code data. The bitmap data of each page obtained by the rendering is compressed by the image compression unit 122 and sequentially stored in the storage unit 108.

The compressed data thus stored in the storage unit 108 is then read out in a print operation based on an instruction from the job control processing unit 201, and a decompression process is performed on the data by the image decompression unit 123. The image data decompressed by the image decompression unit 123 is, if necessary, inputted into the image editing image processing unit 121 and subjected to an image editing process, and then inputted into the printer image processing unit 119 through the device I/F 117.

<Printer Image Processing Unit>

Figure 3:
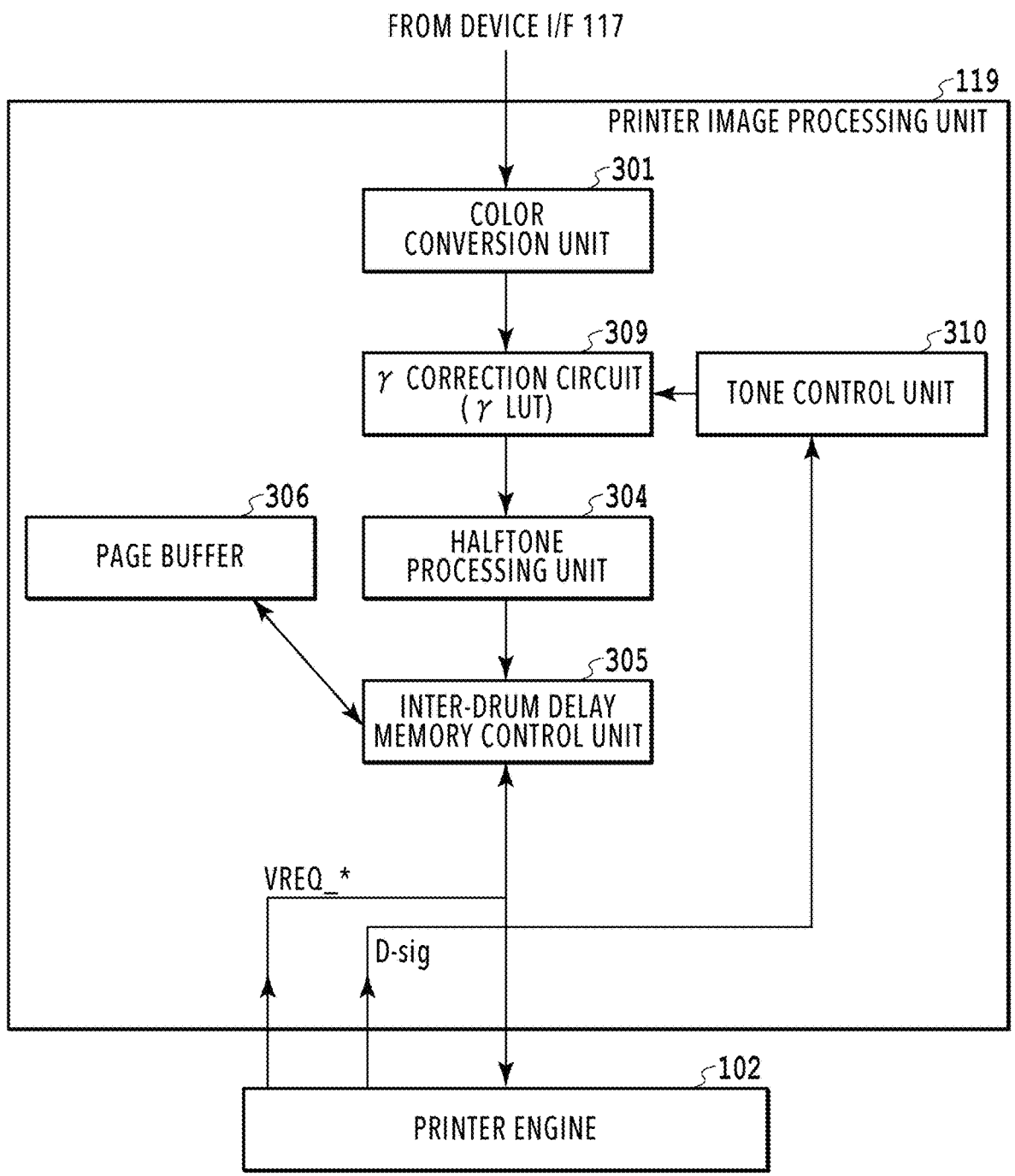
FIG. 3 is a block diagram illustrating the configuration of a printer image processing unit.

FIG. 3 is a block diagram explaining the functional configuration of the printer image processing unit 119.

A color conversion unit 301 converts image data from its luminance values (in RGB, YUV, or the like) into density values (in CMYK or the like). Specifically, the color conversion unit 301 converts inputted image data into a density signal of multi-level image data being data in a color space corresponding to color components that can be printed by the printer engine 102. The density signal of the multi-level image data converted into density values by the color conversion unit 301 is converted by a γ correction circuit 309 (hereinafter, γ LUT) into signal values to be used by the printer engine 102 for density reproduction. The γ LUT is a lookup table for gamma conversion and created by a tone control unit 310 to be described next.

The tone control unit 310 performs a process associated with tone control to be described later in detail. The tone control unit 310 determines an image pattern to be used in the tone control, and inputs image data on the determined image pattern into a halftone processing unit 304 through the γ LUT. In this case, the γ LUT is a linear table having equal input-output levels and is input data capable of detecting the γ characteristic of the printer engine 102. The tone control unit 310 receives an image pattern detection result (D-sig) to be described in detail later from each of image density sensors 801 to be described later (see FIG. 8) through the device I/F 117. The tone control unit 310 creates a γ LUT in accordance with the received image pattern detection result and sets the created γ LUT as the γ LUT 309. The image data corrected by the γ LUT 309 is subjected to a halftone process by the halftone processing unit 304 to be converted into image data in which each color component at each single pixel is expressed with a two-level value (1 bit). General methods of performing the halftone process include dithering, error diffusion, and so on, and any of these methods may be used in this embodiment. Note that the method of the halftone process is not limited to the above methods, but a method other than those may be used.

The two-level image data generated by the conversion process by the halftone processing unit 304 is separated into pieces for the color components for each pixel in the image data through an inter-drum delay memory control unit 305 and temporarily stored in a page buffer 306. When a video data request signal for any one of the color components transmitted from the printer engine 102 is inputted, the image data of the corresponding color component is read out of the page buffer 306 and transmitted to the printer engine 102. Note that there are video data request signals VREQ_Y, VREQ_M, VREQ_C, and VREQ_K for yellow, magenta, cyan, and black color components, respectively. This is because, due to the arrangement of photosensitive drums 501 for the respective color components in the printer engine 102, the timing to control the exposure of each photosensitive drum is different from the other photosensitive drums and accordingly the timing to read out the data of each color component is different from the other color components.

Next, a two-component developer used by each developing unit included in the image forming apparatus in this embodiment will be described.

The two-component developer contains a non-magnetic toner and a low-magnetized high-resistance carrier as its main components. The non-magnetic toner contains a binding resin such as styrene-based resin or polyester resin, a coloring agent such as carbon black, dye, or pigment, a release agent such as wax, and a charge control agent, and so on mixed in appropriate amounts. The non-magnetic toner with such a composition can be manufactured by a method such as pulverization or polymerization.

Note that the amount of triboelectric charge of the non-magnetic toner (negative charging characteristic) is preferably about $-1\times10^{-2}$ to $-5.0\times10^{-2}$ C/Kg. This is because in a case where the amount of triboelectric charge of the non-magnetic toner is outside the above range, the amount of counter charge generated on the magnetic carrier will be so large as to deteriorate the level of voids and thus result in an image defect. The amount of triboelectric charge of the non-magnetic toner may be adjusted on the basis of the type of the material used or the like or adjusted by adding an external additive for controlling the charge or fluidity contained in toners.

Using a general blow-off method, the amount of triboelectric charge of the non-magnetic toner can be figured out by sucking the toner from the developer, the amount of which is approximately 0.5 to 1.5 g, by air suction and measuring the amount of charge induced in a measurement container.

Also, as the magnetic carrier, publicly known carriers are usable. For example, it is possible to use a resin carrier formed by dispersing, in a resin, magnetite as a magnetic material and dispersing carbon black for making the carrier electrically conductive and for adjusting the resistance. It is also possible to use a magnetite such as ferrite alone with its surface subjected to an oxidation or reduction treatment to adjust the resistance. It is also possible to use a magnetite such as ferrite alone with its surface coated with a resin to adjust the resistance, and the like. The methods of manufacturing these magnetic carriers are not particularly limited.

Note that the magnetic carrier preferably has a magnetization of $3.0\times10^4$ A/m to $2.0\times10^5$ A/m in a magnetic field of 0.1 T (tesla). This is because in a case where the amount of magnetization of the magnetic carrier is small, such an amount can provide an advantage that scavenging by a magnetic brush can be suppressed, but in a case where the amount of magnetization is less than the above lower limit value, the following problem may possibly occur. It is difficult to attach the magnetic carrier to a non-magnetic cylindrical body with a magnetic field generation unit, which may lead to image defects by attachment of the magnetic carrier to the photosensitive drum or the like and image defects by sweep or the like. On the other hand, in a case where the amount of magnetization of the magnetic carrier is more than the above upper limit value, image defects may possibly occur due to the pressure of the magnetic brush, as mentioned above. The magnetic carrier used is more preferably one having a volume resistivity of $10^7$ to $10^{14}$ Ω·cm in consideration of leakage and developability.

The magnetization of the carrier was measured using BHV-30, which was an oscillating magnetic field-type automatic magnetic characteristic recording apparatus manufactured by Riken Denshi Co., Ltd. The magnetic characteristic value of the carrier powder used was a value obtained by generating an external magnetic field of 0.1 T and measuring the strength of the magnetization in that state. A measurement sample of the carrier used was one prepared by filling a sample carrier into a cylindrical plastic container in a sufficiently densely packed state. In this state, the magnetizing moment and the actual weight of the filled sample were measured, and these measured values were used to figure out the strength of the magnetization ($AM^2$/Kg). Then, the true relative density of the carrier particles was figured out using AccuPyc, which was an automatic dry densitometer manufactured by Shimadzu Corporation.

Then, the strength of the magnetization ($AM^2/Kg$) figured out above was multiplied by the true relative density to figure out the strength of the magnetization per unit volume (A/m) used in this embodiment.

Next, description will be given of an operation performed in response to input of a piece of color component data output from the printer image processing unit 119 into the printer engine 102.

<Printer Engine>

Figure 4:
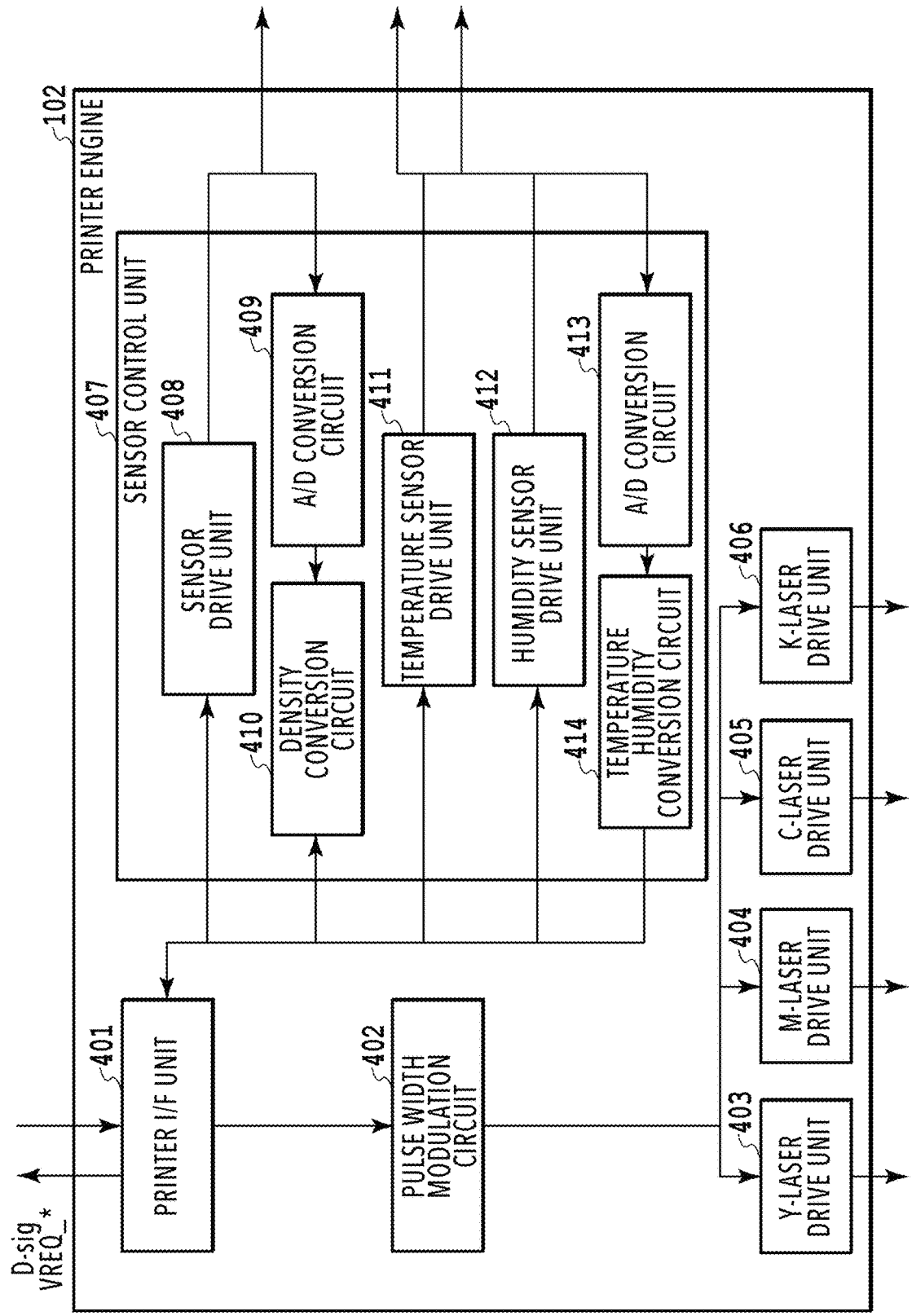
FIG. 4 is a block diagram illustrating the configuration of a printer engine.

FIG. 4 is a block diagram explaining the internal configuration of the printer engine 102.

A printer I/F unit 401 receives pieces of color component data sequentially transmitted from the printer image processing unit 119. Also, the printer I/F unit 401 issues VREQ_*, which is a video data request signal requesting a piece of color component data in a case where the printer engine 102 becomes ready to perform a print operation. "*" of the video data request signal means one of Y, M, C, and K. Each piece of color component data is inputted into a pulse width modulation circuit 402 through the printer I/F unit 401.

On the basis of the actual pieces of color component data thus inputted, the pulse width modulation circuits 402 generates pulse signals (drive signals) for driving laser drive units 403 to 406 of the respective colors to be described in detail later and transmits them to the laser drive units 403 to 406, respectively.

The laser drive units 403 to 406 drive laser exposure apparatuses for the respective color components on the basis of the respective pulse signals received from the pulse width modulation circuit 402.

A sensor drive unit 408 in a sensor control unit 407 drives each image density sensor 801 to be described later. Driven by the sensor drive unit 408, the image density sensor 801 detects the density of a patch image to be described in detail later formed on the corresponding photosensitive drum 501 on the basis of an image pattern outputted from the tone control unit 310. The detected value of the density of the patch image detected by the image density sensor 801 is inputted into an A/D conversion circuit 409 and converted into a digital signal by the A/D conversion circuit 409. The detected value of the density of the patch image converted into a digital signal is inputted into a density conversion circuit 410 and converted into a density value (D-sig) by the density conversion circuit 410. Then, the sensor control unit 407 transmits the density value (D-sig) as the result of the detection to the tone control unit 310 through the printer I/F unit 401.

The sensor control unit 407 is also provided with a temperature sensor drive unit 411 that drives a temperature sensor 514 and a humidity sensor drive unit 412 that drives a humidity sensor 515. Driven by the temperature sensor drive unit 411, the temperature sensor 514 detects temperature. Driven by the humidity sensor drive unit 412, the humidity sensor 515 detects humidity. The detected values of the temperature and the humidity detected by the temperature sensor 514 and the humidity sensor 515 are inputted into an A/D conversion circuit 413 and converted into digital signals by the A/D conversion circuit 413. The detected values of the temperature and the humidity converted into digital signals by the A/D conversion circuit 413 are transmitted as temperature-humidity information from the sensor control unit 407 to the tone control unit 310 through the printer I/F unit 401.

Next, image forming units in the printer engine will be described.

<Image Forming Unit>

Figure 5:
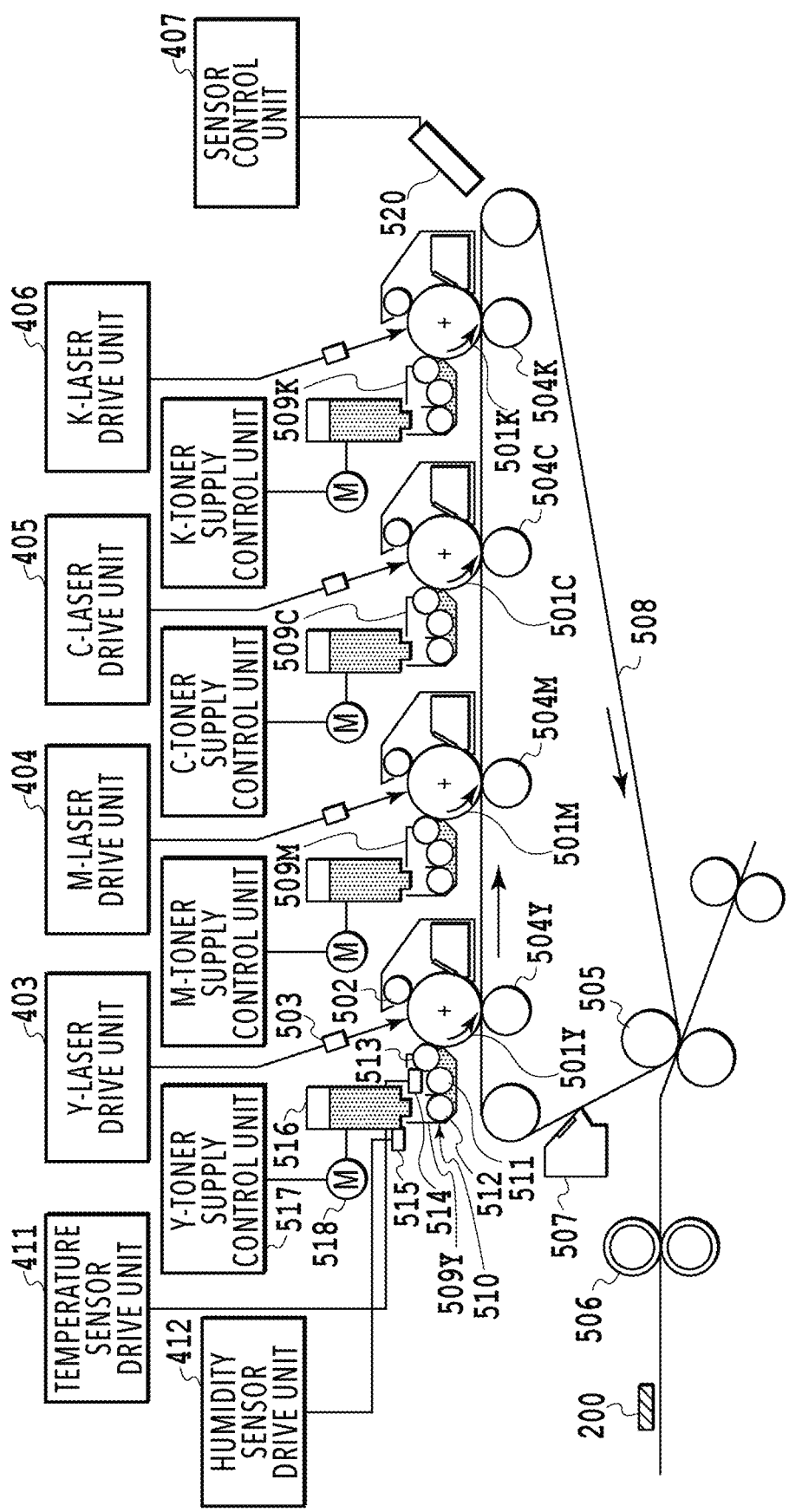
FIG. 5 is a diagram explaining details of image forming units in the printer engine.

FIG. 5 is a diagram explaining details of the image forming units in the printer engine 102. Description will be given below mainly of the image forming unit for yellow images and description of the image forming units for the other color components, which are magenta, cyan, and black, will be omitted since they also have similar configurations. Also, the last letters in the reference numerals of the constituent components of the image forming unit for yellow images are replaced with M, C, and K, representing the other colors, to denote the constituent components of the image forming units for those colors, while some constituent components are not denoted so to simplify the drawing. In addition, the following description will be given while omitting description for M, C, and K, representing the above other colors, in a case where it is not necessary.

The printer engine 102 includes a photosensitive drum 501 as an image carrier, a charge roller 502, a Y-laser exposure apparatus 503, a primary-transfer apparatus 504, a secondary-transfer apparatus 505, a fixing apparatus 506, and a cleaning apparatus 507. The Y-laser exposure apparatus 503 is driven by the Y-laser drive unit 403. The primary-transfer apparatus 504 performs primary transfer of a visible toner image onto a transfer material (intermediate transfer belt) 508. The secondary-transfer apparatus 505 performs secondary transfer of the toner image formed on the intermediate transfer belt 508, which is an image carrier, onto a printing sheet. The fixing apparatus 506 fixes the toner image transferred onto the printing sheet. The cleaning apparatus 507 removes the residual transferred toner remaining on the intermediate transfer belt 508 after the secondary transfer.

A developing unit 509 includes a developer container 510. The developer container 510 stores therein a developer, which is a two-component developer, obtained by mixing toner particles (toner) and magnetic carrier particles (carrier). The developer container 510 accomodates therein an A-screw 511 and a B-screw 512. The A-screw 511 and the B-screw 512 each convey the toner particles and mix the toner particles with the magnetic carrier particles. Also, a developing sleeve 513 is disposed near the photosensitive drum 501 and carries the developer in which the toner and the carrier are mixed by rotating so as to follow the rotation of the photosensitive drum 501. The developer carried on the developing sleeve 513 contacts the photosensitive drum 501 to develop an electrostatic latent image on the photosensitive drum 501.

Also, an inside-developing-unit temperature sensor (hereinafter, referred to as "temperature sensor") 514 is disposed inside the developing unit 509, and an outside-developing-unit humidity sensor (hereinafter, referred to as "humidity sensor") is disposed outside the developing unit 509. The temperature sensor 514 and the humidity sensor 515, provided for each developing unit, are driven by the temperature sensor drive unit 411 and the humidity sensor drive unit 412 of the sensor control unit 407 to detect temperature and humidity. The detected values of the temperature and the humidity detected by the temperature sensor 514 and the humidity sensor 515 are outputted to the A/D conversion circuit 413 and converted into digital signals by the A/D conversion circuit 413. The digital signals are converted by a temperature-humidity conversion circuit 414 and outputted as temperature-humidity information. Then, the temperature-humidity information is transmitted as the results of the detections to the tone control unit 310 through the printer I/F unit 401. Note that the printer engine 102 includes constituent components other than those in FIG. 5, such as a conveyance unit (not illustrated) that conveys printing sheets, but description thereof is omitted in this embodiment.

Description will now be given of a case of forming a yellow image in the printer engine 102 with the above configuration.

Driven by the Y-laser drive unit 403, the Y-laser exposure apparatus 503 exposes the photosensitive drum 501 to light to form an electrostatic latent image on the photosensitive drum 501. The formed electrostatic latent image is visualized as a toner image with the yellow developer carried on the developing sleeve 513 of the developing unit 509, and the visible toner image is transferred onto the intermediate transfer belt 508 by the primary-transfer apparatus 504.

Similarly, pieces of image data of the magenta, cyan, and black color components are developed by the developing units 509M to 509K for the respective colors and visualized as toner images on the respective photosensitive drums 501M to 501K. The visible toner images are sequentially transferred by the respective primary-transfer apparatuses 504M to 504K each in synchronization with the toner image of the color component transferred immediately before it, so that a final toner image formed of the toner images of the four colors is formed on the intermediate transfer belt 508. The toner image thus formed on the intermediate transfer belt 508 is subjected to secondary transfer by the secondary-transfer apparatus 505 onto a printing sheet conveyed in synchronization with it, and the toner image is fixed by the fixing apparatus 506. The printing sheet with the image formed (printed) thereon by the printer engine 102 is then discharged, and the printing operation ends. On the path from the fixing apparatus 506 to the point where the printing sheet is discharged, a sensor 200 is provided which obtains information on the density of the formed image. Also, between the primary-transfer position and the secondary-transfer position, a photosensor 520 is provided which includes an LED and a photodiode facing the intermediate transfer belt 508 and detects the amount of reflected light from a patch pattern formed on the intermediate transfer belt 508.

The toner density of the developer in each developing unit 509 decreases as it develops electrostatic latent images as above. For this reason, a toner supply control unit 517, provided for each color, controls the drive of a toner supply motor 518 to perform control for supplying the toner from a toner supply tank 516 to the developing unit 509 (toner supply control). As a result, the toner density of the developer, or the image density, is controlled to be as constant as possible.

Density control apparatuses for controlling the density in such a manner will be described below.

The image forming apparatus 100 includes a density control apparatus employing a control method based on detection of the image density of a patch image formed the photosensitive drum 501 with an image density sensor (patch detection ATR sensor) installed to face the photosensitive drum (patch detection ATR). The image forming apparatus 100 also includes a density control apparatus employing a control method based on detection of the toner density of the developer in the developing unit 509 with a toner density sensor (developer reflection ATR sensor) (developer reflection ATR). The image forming apparatus 100 also includes a density control apparatus employing a control method based on computation of a necessary toner amount from the output level of a pixel-by-pixel digital image signal from a video counter (video count ATR). Thus, the image forming apparatus 100 includes density control apparatuses employing three methods.

<Halftone Dots>

Here, description will be given of halftone dots used in AM (Amplitude Modulated) screening tone reproduction.

Figure 6C:
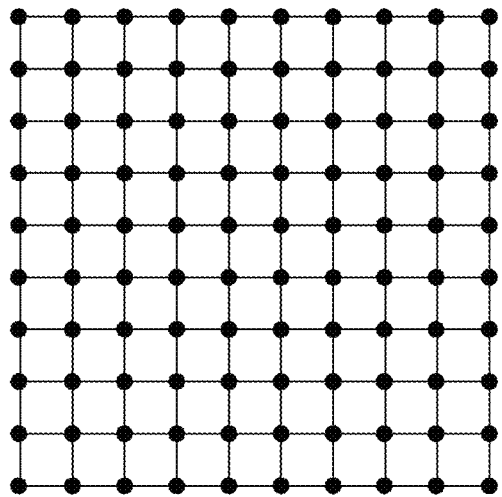
FIG. 6A to FIG. 6C are diagrams explaining halftone dots used in conventional AM screening tone reproduction.
Figure 6B:
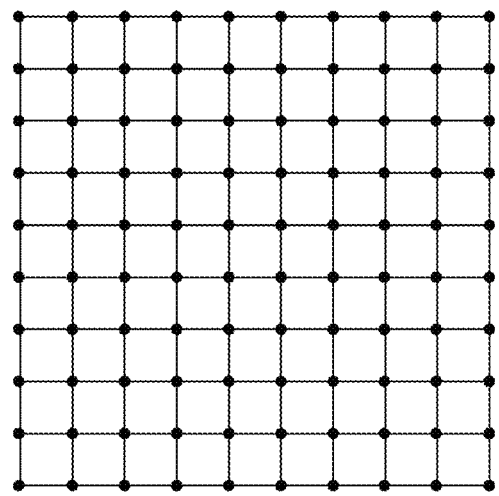
Figure 6A:
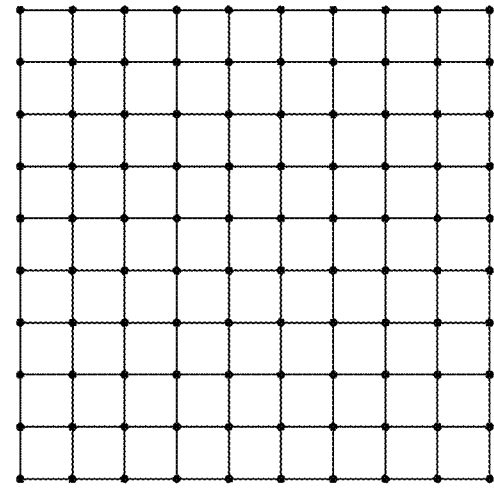

FIG. 6A to FIG. 6C are diagrams explaining halftone dots used in conventional AM screening tone reproduction. Halftone dots used in conventional AM screening tone reproduction are in any shapes such as a circular shape, an elliptical shape, a square shape, or a rectangular shape, and express tones by means of area modulation involving changing the dot size in accordance with the density, as illustrated in FIG. 6A to FIG. 6C. Specifically, the density increases from the AM screen illustrated in FIG. 6A to the AM screen illustrated in FIG. 6B and then to the AM screen illustrated in FIG. 6C. The dot size also increases from the AM screen illustrated in FIG. 6A to the AM screen illustrated in FIG. 6B and then to the AM screen illustrated in FIG. 6C in accordance with the density. Note that FIG. 6A to FIG. 6C all have the same number of screen lines and that the dots in each AM screen have the same dot size.

<Image Density Detection and Image Halftone Control>

Next, image density detection and image halftone control will be described.

Figure 7:
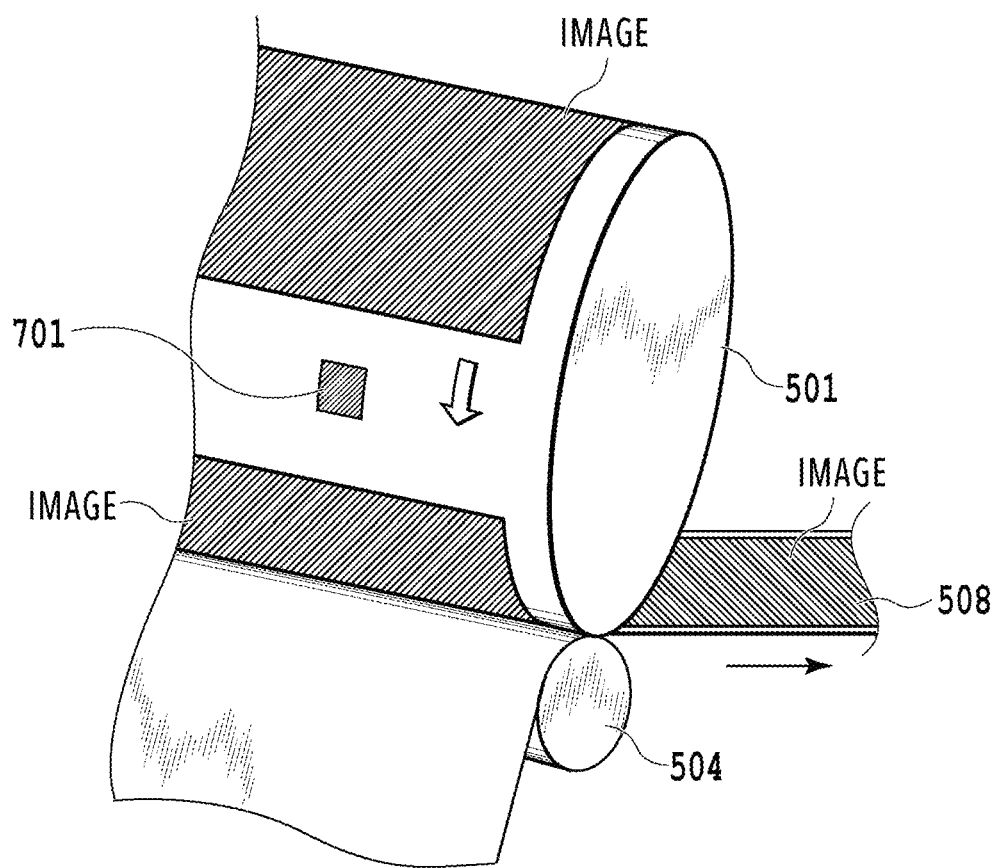
FIG. 7 is a diagram explaining a state where a patch image is formed on a photosensitive drum.

FIG. 7 is a diagram explaining a state where a pattern for image density detection (hereinafter, referred to as "patch image") is formed on the photosensitive drum 501.

In this embodiment, as illustrated in FIG. 7, during consecutive image formation, the CPU 105 forms a patch image 701 on a non-image region between the leading edge of an image to be outputted and the trailing edge of another image to be outputted (hereinafter, referred to as "between images"). Note that an electrostatic latent image of the patch image 701 will also be referred to as "patch latent image" below.

Specifically, the printer image processing unit 119 is provided with a patch image signal generation circuit (pattern generator (not illustrated)) that generates a patch image signal having a signal level corresponding to a preset density. The pattern generator supplies the generated patch image signal to the pulse width modulation circuit 402. In response to the patch image signal, the pulse width modulation circuit 402 generates laser drive pulses having a pulse width corresponding to the above preset density and supplies the generated laser drive pulses to the semiconductor laser of the laser exposure apparatus 503. The semiconductor laser emits light for a period of time corresponding to the pulse width of the laser drive pulses to expose the photosensitive drum 501 to the light in a scanning manner. As a result, a patch latent image corresponding to the above preset density is formed on the photosensitive drum 501. This patch latent image is then developed by the developing unit 509.

The amount of reflected light from the patch image 701, formed on the photosensitive drum 501, is measured by the image density sensor 801 (see FIG. 8), which is an image density detection unit. Similarly to the sensor 200 and the photosensor 520 in FIG. 5, the image density sensor 801 includes a light emitting unit equipped with a light emitting element such as an LED and a light receiving unit equipped with a light receiving element such as a photodiode (PD). The image density sensor 801 measures the above amount of reflected light when the patch image 701, formed "between images" on the photosensitive drum 501, passes the detection zone for the image density sensor 801. A signal on the result of the measurement by the image density sensor 801 (D-sig) is inputted into the CPU 105. Thereafter, the CPU 105 figures out a corrected amount of toner supply with which a certain desired level of density (amount of reflected light) can be expected to be obtained (described later). During consecutive image formation, a patch image 701 is formed on the non-image region (between images) between the trailing edge of an image and the leading edge of the next image after every predetermined number of sheets to be outputted, e.g. 200 sheets. Thus, a patch image 701 is formed between images after every consecutive image formation of 200 sheets.

This embodiment has been described with an example in which a patch image 701 is formed on the photosensitive drum 501 and its density is measured. However, a patch image 701 can be formed and measured on the intermediate transfer belt 508.

Hereinafter, the patch image detection will be described more specifically.

Figure 8:
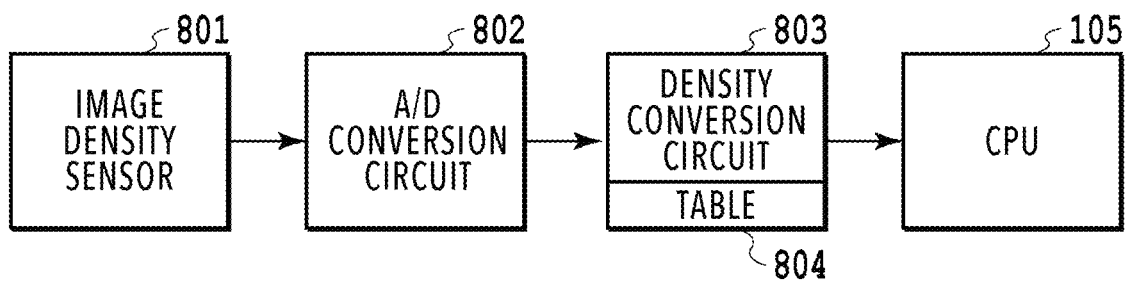
FIG. 8 is a block diagram illustrating an example of a circuit configuration for processing the output signal of an image density sensor.

FIG. 8 is a block diagram illustrating an example of a circuit configuration for processing the output signal of the image density sensor 801.

The image density sensor 801 is installed to face the photosensitive drum 501 and detects reflected light (near-infrared light) from the photosensitive drum 501. The image density sensor 801 converts the detected reflected light into an electrical signal of 0 to 5 V. The image density sensor 801 outputs the 0 to 5 V electrical signal to an A/D conversion circuit 802.

The A/D conversion circuit 802 converts the 0 to 5 V electrical signal, outputted from the image density sensor 801, into an 8-bit digital signal. The A/D conversion circuit 802 outputs the digital signal to a density conversion circuit 803.

The density conversion circuit 803 converts the digital signal, outputted from the A/D conversion circuit 802, into a density signal as density information by referring to a table 804 held in the density conversion circuit 803.

Here, description will be given of the reflected light from the photosensitive drum 501 inputted into the image density sensor 801. First, the toner of a visible toner image on the photosensitive drum 501 is, for example, a styrene-based copolymer resin as a binder and a color material of the corresponding color dispersed therein. Also, the photosensitive drum 501 is, for example, an organic photoconductor (OPC) with a reflectance of approximately 40% for near-infrared light (960 nm). The photosensitive drum 501 is not limited to such OPCs but may be an amorphous silicon-based photoconductor or the like having a reflectance for near-infrared light equal or close to that of the OPCs. In this embodiment, the image density sensor 801 is configured to detect only specularly reflected light from the photosensitive drum 501.

Here, the correlation between the output value of each image density sensor 801 and the image density will be described.

Figure 9:
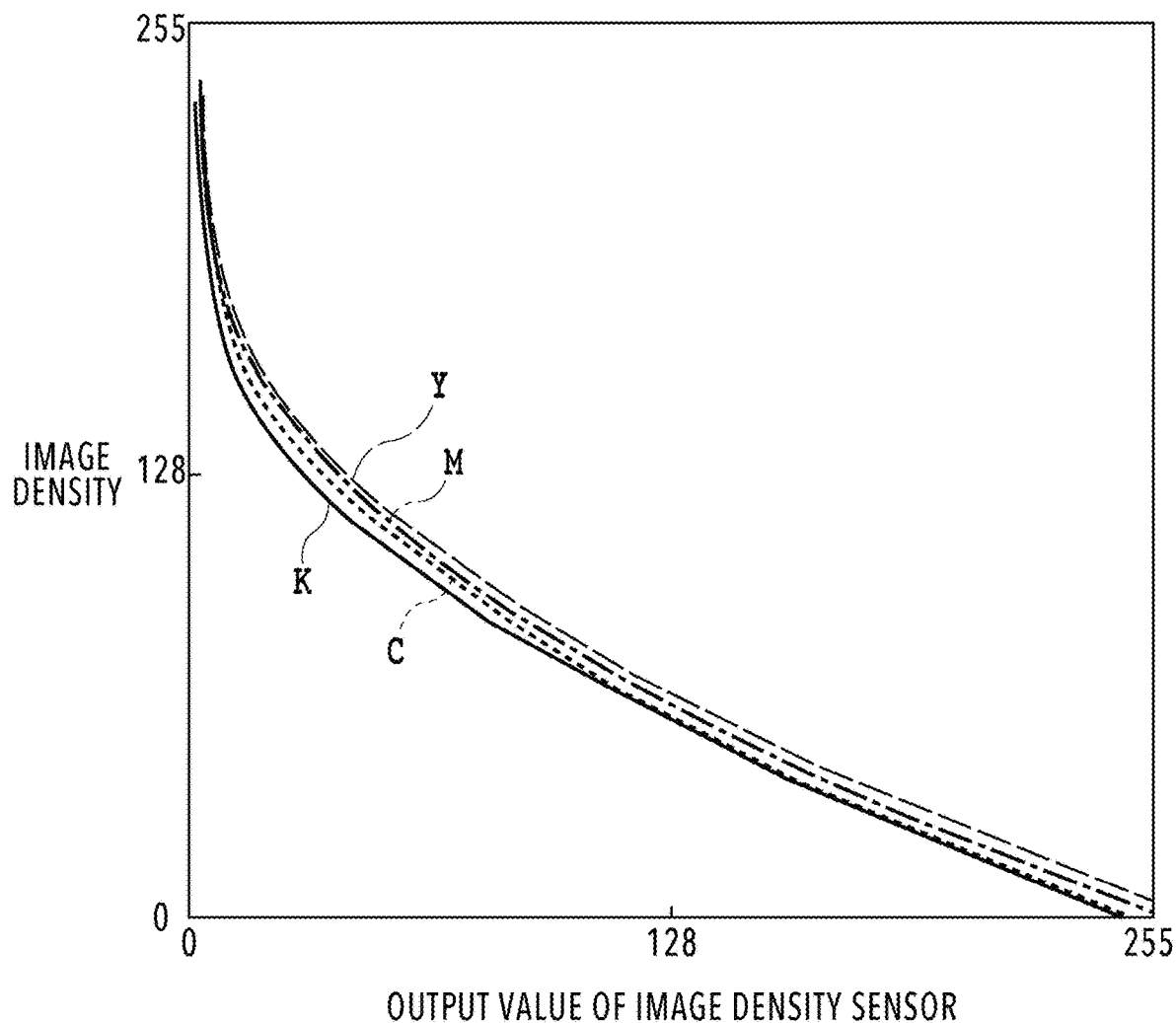
FIG. 9 is a diagram illustrating an example of the correlation between the output value of each image density sensor and the density of the patch image.

FIG. 9 is a diagram illustrating an example of the correlation between the output value of each image density sensor 801 and the density of a patch image 701 formed on the corresponding photosensitive drum 501 in a case where the density of the patch image is varied stepwise by means of area gradation of the corresponding color (Y, M, C, or K). Note that the output of the image density sensor 801 in the state where no toner is attached to the photosensitive drum 501 is set to 5 V, i.e. a level of 255.

As illustrated in FIG. 9, for each toner (Y, M, C, K), the higher the ratio of the area covered by the toner and thus the higher the image density, the lower the output value of the image density sensor 801. On the basis of this characteristic of each image density sensor 801, a table 804 is prepared in advance which is dedicated for the corresponding color and converts the output value of the corresponding image density sensor 801 into a density signal. This table 804 is stored in a storage unit in the density conversion circuit 803. In this way, the density conversion circuit 803 can accurately read the image density of each color. The density conversion circuit 803 outputs the density signal, which is density information obtained by the above conversion, to the CPU 105.

Note that in this embodiment, for each color, a laser output used to form a patch image 701 is a 64-level density signal. This laser output is determined using the γ LUT.

In this embodiment, a patch image 701 is formed on the non-image region during normal image formation, and the density of that patch image 701 is detected, based on which control is performed to correct the halftone of the image as appropriate.

Figure 10:
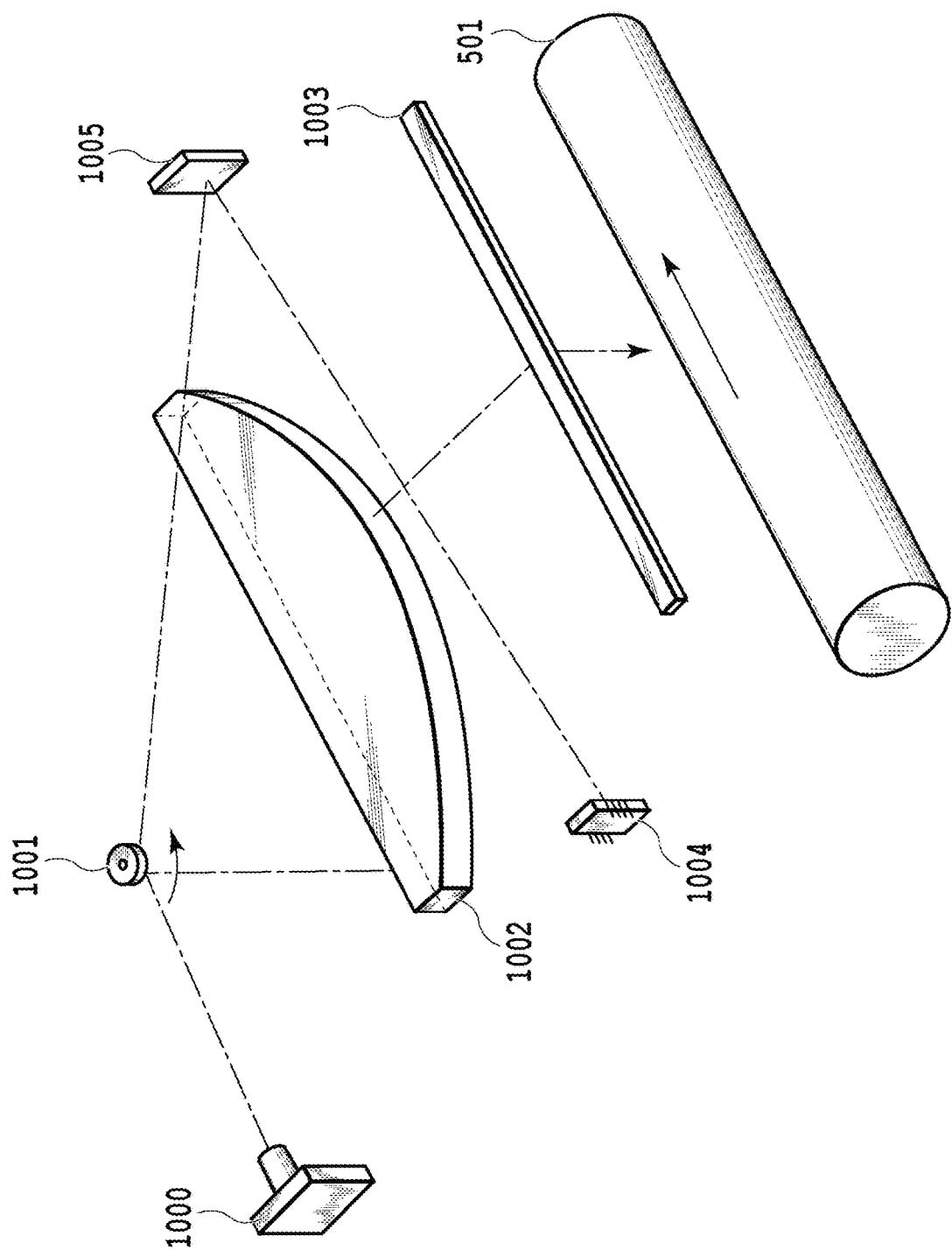
FIG. 10 is a diagram illustrating an example of each laser exposure apparatus in the image forming apparatus.

FIG. 10 is a diagram illustrating an example of each laser exposure apparatus 503 of the image forming apparatus 100.

A semiconductor laser (hereinafter, simply referred to as "laser") 1000 is an example of a light source. The laser 1000 functions as a laser light emitting unit that generates and emits a beam (laser light) in response to a video signal from a video controller not illustrated or a control signal from an engine controller not illustrated. A polygon mirror 1001 is an example of a rotary polygon mirror. The polygon mirror 1001 is rotationally driven in the direction of the arrow therearound in the figure by a motor not illustrated and reflects the beam from the laser 1000. The reflected beam is scanned over the photosensitive drum 501. The motor that rotates the polygon mirror 1001 is controlled at a constant rotational speed by an acceleration signal or deceleration signal from the engine controller not illustrated. The beam from the laser 1000 is scanned over the photosensitive drum 501 in the direction of the arrow thereon through a fθ lens 1002 and a turning mirror 1003. The fθ lens 1002 is an optical component for scanning the beam at a constant speed over the photosensitive drum 501. A beam detector 1004 is an element that converts light into voltage. This beam detector 1004 receives with a predetermined timing the beam reflected from a mirror 1005 provided on the scan path of the beam. The beam detector 1004 generates a BD signal with a voltage generated by that received light, and outputs the BD signal to a CPU or a logic circuit in the engine controller not illustrated. This BD signal is used as a horizontal synchronization signal during image formation.

As mentioned earlier with reference to FIG. 6A to FIG. 6C, halftone dots used in usual AM screening tone reproduction are in any shape such as a circular shape, an elliptical shape, a square shape, or a rectangular shape, and express tones by means of area modulation involving changing the dot size in accordance with the density. Thus, with FIG. 6A to FIG. 6C, the density increases from the AM screen illustrated in FIG. 6A to the AM screen illustrated in FIG. 6B and then to the AM screen illustrated in FIG. 6C. The dot size also increases from the AM screen illustrated in FIG. 6A to the AM screen illustrated in FIG. 6B and then to the AM screen illustrated in FIG. 6C in accordance with the density. Also, the dots in each of FIG. 6A to FIG. 6C have the same size.

In contrast, in this embodiment, screens for halftone reproduction are as follows. Specifically, conventional AM screens are used for regions where the CMYK density is higher than approximately 20% (regions other than highlight regions). On the other hand, for regions where the CMYK density is lower than or equal to approximately 20% (highlight regions), the size of dots that forms the screen is fixed.

Figure 11C:
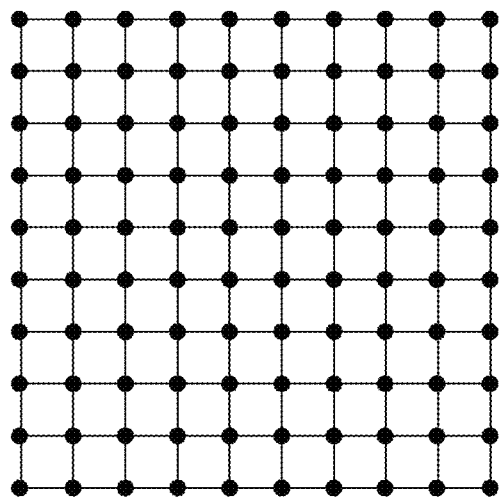
FIG. 11A to FIG. 11C are diagrams illustrating examples of halftone dot patterns with different densities for screens with a specified type of halftone dot, used in tone reproduction by the image forming apparatus.
Figure 11B:
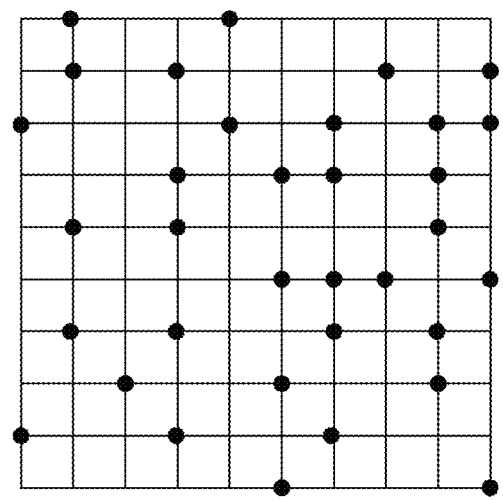
Figure 11A:
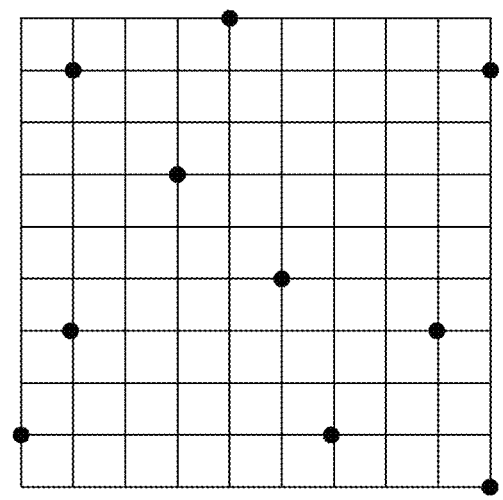

Further, for highlight regions, the tone is expressed by means of the number of dots instead of the dot size as with conventional AM screening, as illustrated in FIG. 11A and FIG. 11B; in other words, used is screens expressing tones by means of the number of dots of a fixed size arranged at lattice points on a dither pattern.

FIG. 11A to FIG. 11C are diagrams illustrating examples of halftone dot patterns with different densities for screens with a specified type of halftone dot, used in tone reproduction by the image forming apparatus 100. Note that FIG. 11A to FIG. 11C all have the same dot size and the same number of screen lines.

As illustrated in FIG. 11A and FIG. 11B, for highlight regions, the tone is expressed by means of the number of dots. On the other hand, for regions with higher density than the density region where dots of the fixed size are arranged at all halftone dot growth points (FIG. 11C), used are screens expressing the tone by increasing the dot size, as with conventional AM screening.

Here, the correlations between the dot size and the granularity and halftone dot reproducibility will be described.

Figure 12:
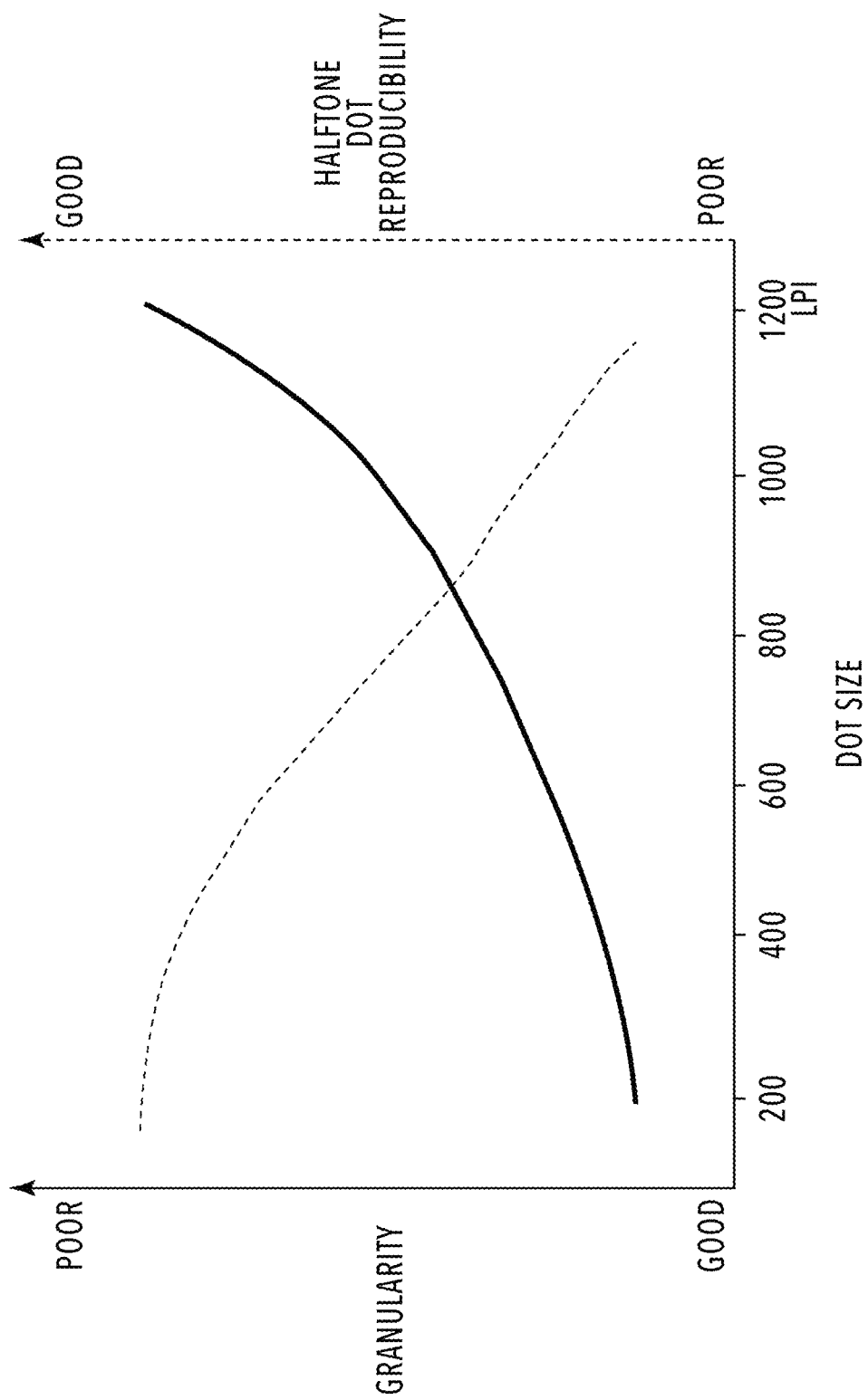
FIG. 12 is a diagram illustrating an example of the correlation between the dot size and the graininess and halftone dot reproducibility.

FIG. 12 is a diagram illustrating an example of the correlations between the dot size and the granularity and halftone dot reproducibility. As for the granularity, "GOOD" means low granularity while "POOR" means high granularity. As the halftone dot reproducibility, "GOOD" means high halftone dot reproducibility while "POOR" means low halftone dot reproducibility.

As illustrated in FIG. 12, in halftone reproduction, highlight regions (FIG. 11A, FIG. 11B) in particular, which have a small dot size and which tones are expressed by means of the number of dots, are unstable in terms of halftone dot reproducibility and have poor granularity, which is likely to be sensed as noise.

Here, description will be given of a visual spatial frequency characteristic visual transfer function (VTF) representing the human vision's sensitivity characteristic to spatial frequencies.

Figure 13:
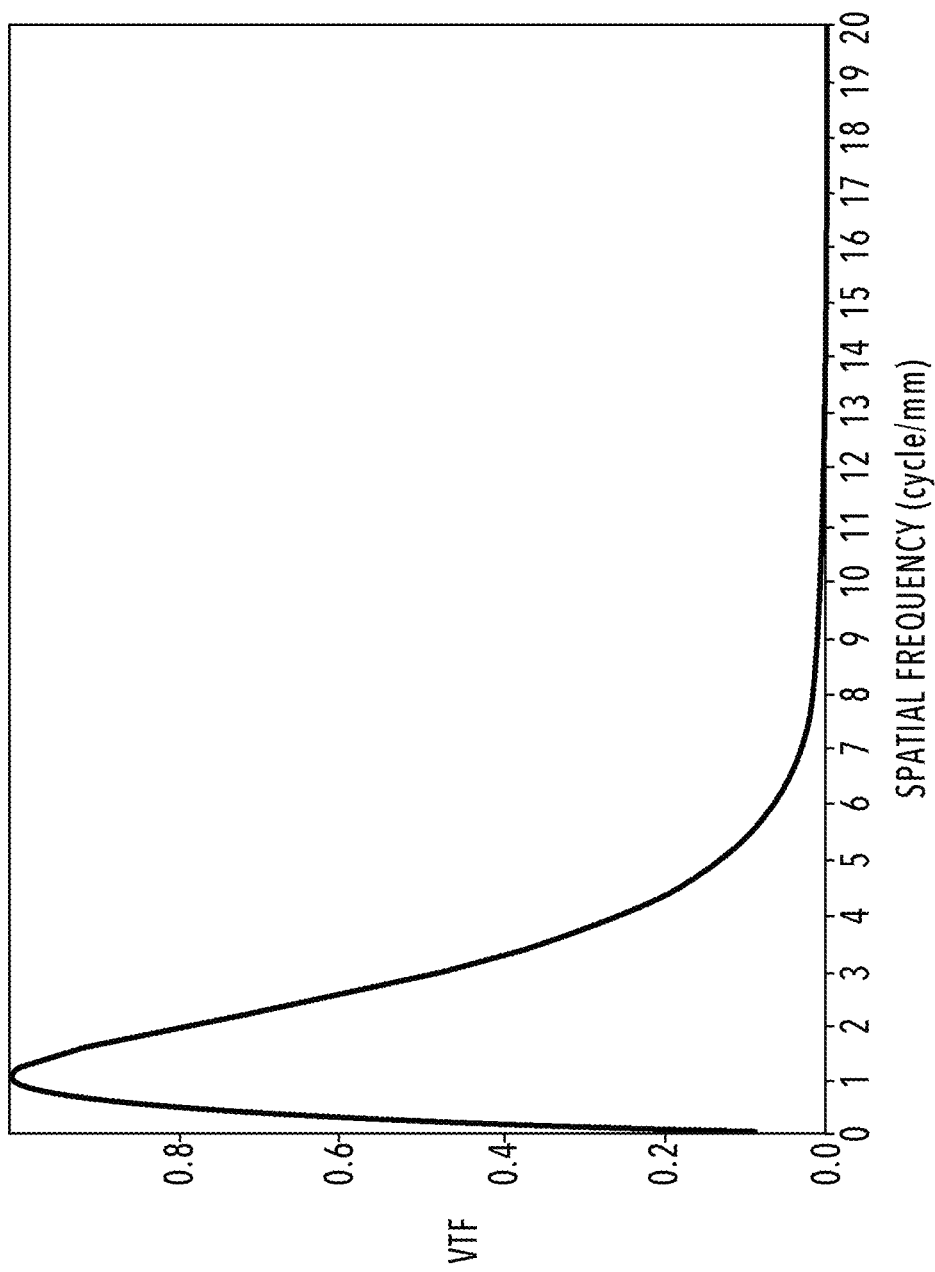
FIG. 13 is an explanatory diagram conceptually illustrating a spatial frequency characteristic VTF.

FIG. 13 is an explanatory diagram conceptually illustrating the spatial frequency characteristic VTF, representing the human vision's sensitivity characteristic to spatial frequencies from a visual observation distance of 300 mm. The horizontal axis represents frequency (cycle/mm) while the vertical axis represents strength (power) with respect to frequency. As illustrated in FIG. 13, it can be seen that a peak value in strength is present between 1 cycle/mm and 2 cycle/mm.

A representative empirical equation representing the visual spatial frequency characteristic VTF is given below.

$$VTF(u) = 5.05 \times \exp\{(-0.138 \times \pi \times L \times u)/180\} \times \{1 - \exp\{(-0.138 \times \pi \times L \times u)/180\}\} \quad \text{Equation (1)}$$

In equation (1), the variable L represents the observation distance and the variable u represents the spatial frequency.

In this embodiment, to evaluate the graininess (granularity), the granularity is derived by the following method.

The method of deriving the granularity is a method proposed by Dooley and Shaw of Xerox Corporation in which a Wiener spectrum is employed for graininess measurement, and a value obtained by cascading the Wiener spectrum and the visual spatial frequency characteristic VTF and integrating the result is defined as granularity (GS). Note that the larger the value of GS, the poorer granularity (graininess) it indicates. GS is expressed by equation (2) below.

$$GS = \exp(-1.8\overline{D}) \int \sqrt{\{WS(u)^{-}\}} \times VTF(u) du \quad \text{Equation (2)}$$

where $\overline{D}$ and $WS(u)^{-}$ represent D and WS(u) with an overline, respectively, u represents the spatial frequency, WS(u) represents the Wiener spectrum, VTF(u) represents the visual spatial frequency characteristic (visual spatial frequency transfer function), and the term $\exp(-1.8\overline{D})$ represents a function with the average density $\overline{D}$ as a variable for correcting the difference between the density and the brightness sensed by humans.

The method of deriving the granularity used in this embodiment will be described below.

First, from FIG. 12, it can be seen that a large dot size can keep the granularity low. It can also be seen that the halftone dot reproducibility is correlated with the granularity (GS) such that high halftone dot reproducibility can keep the granularity low.

However, with a large dot size, the dot pattern itself may be noticed, which deteriorates the quality of the image. Thus, the dot size is preferably as small as possible. Also, in a case where the minimum dot size is large, the density is to be expressed by means of the number of halftone dots, and there is a problem that the screen pattern may be visually noticed if the dots are arranged in a regular pattern as with usual AM screening.

Hence, in this embodiment, a method is employed in which, as illustrated FIG. 11A and FIG. 11B, dots are selected at random from among the dots at the AM screen growth points in the case of expressing a tone only with the smallest dots.

Figure 14:
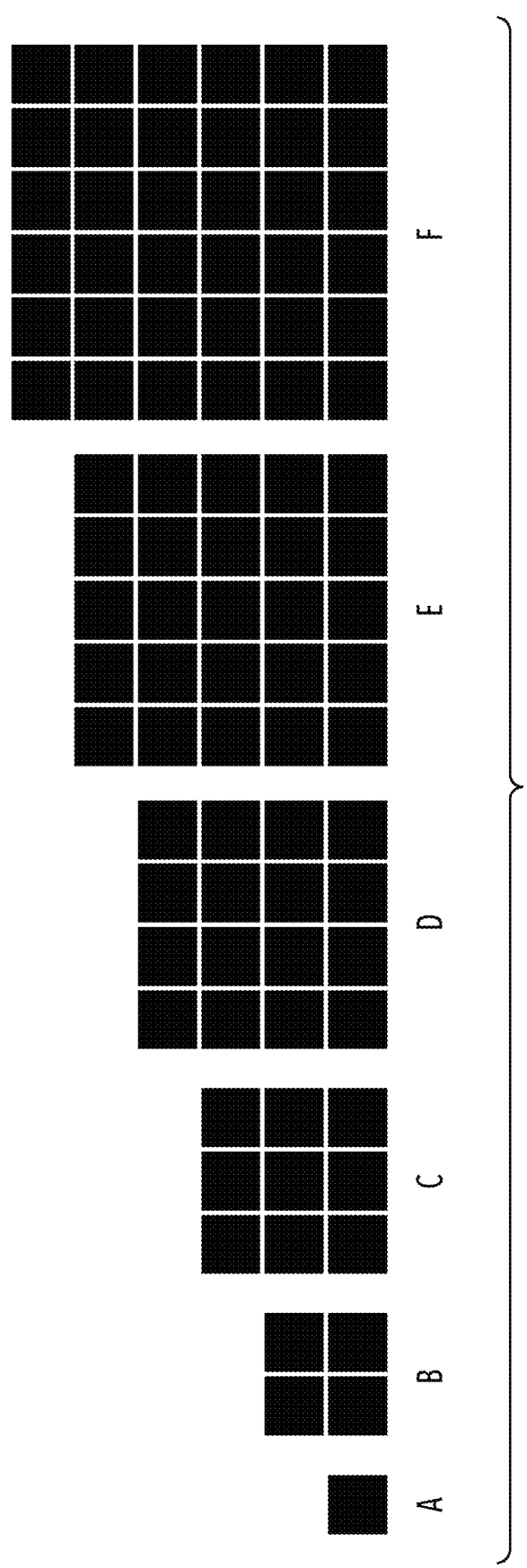
FIG. 14 is a schematic diagram of smallest dots for screens used in the embodiment.

In this embodiment, the image forming apparatus 100 uses an exposure system with a resolution of 2400 dpi and is configured to create 2400-dpi screens with two-level values. FIG. 14 is a schematic diagram of smallest dots for screens used in this embodiment.

Figure 15:
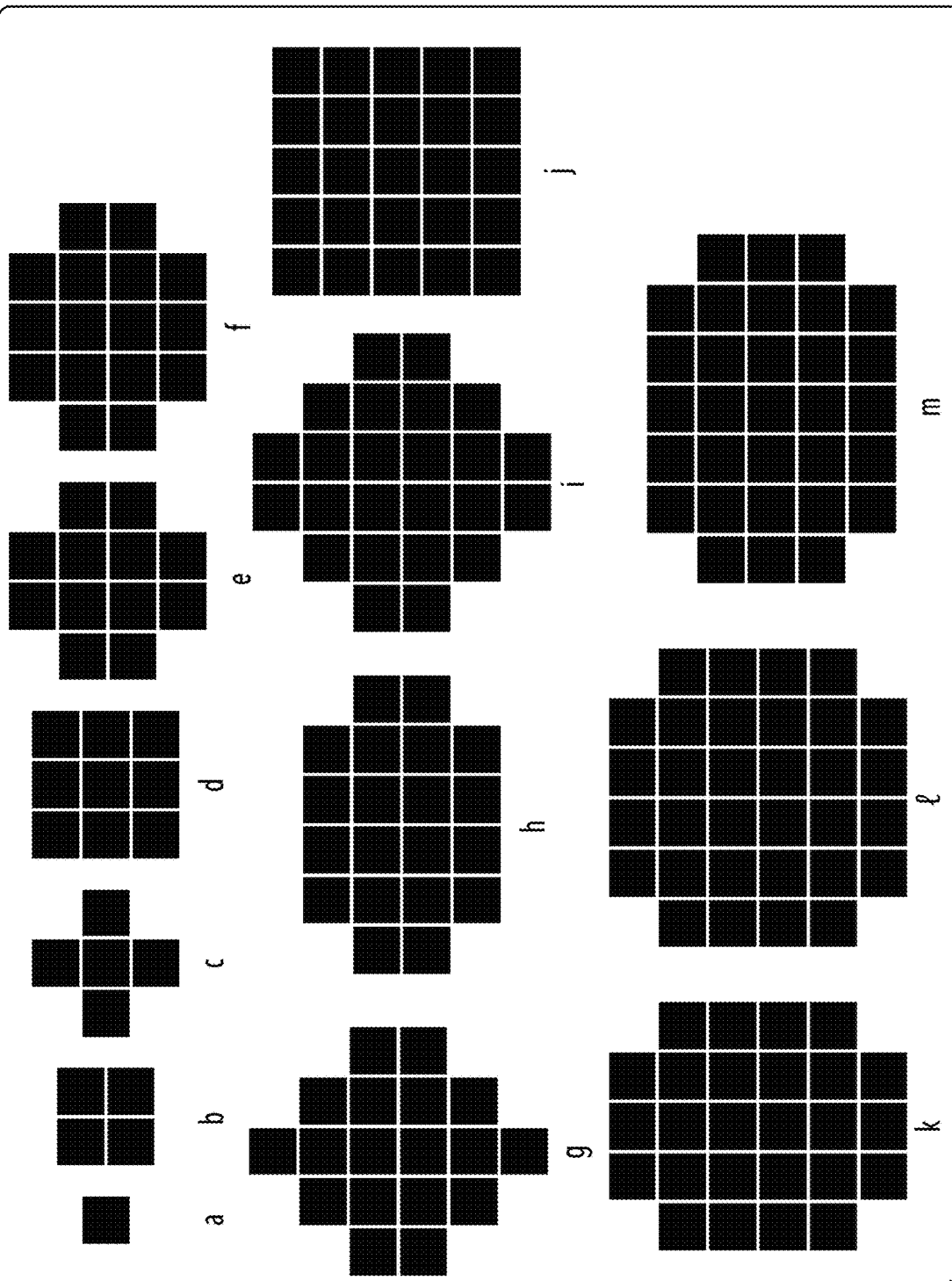
FIG. 15 is a diagram illustrating examples of smallest dot patterns used in the embodiment.

In usual AM screening, as illustrated in FIG. 14, the smallest dot is one pixel. A screen using such dots will be referred to as a screen A. Besides this, with 1200 dpi, there are prepared a screen B using 2×2 pixels as the smallest dot, a screen C using 3×3 pixels as the smallest dot, and a screen D using 4×4 pixels as the smallest dot. There are also prepared a screen E using 5×5 pixels as the smallest dot and a screen F using 6×6 pixels as the smallest dot. Note that although the shape of each dot is square in the illustrated example, this embodiment is not limited to this shape. For example, as illustrated in FIG. 15, it is possible to use a screen c using 5 pixels as the smallest dot in the shape of a crisscross or a screen e using 12 pixels as the smallest dot shaped such that some dots on its edges are omitted. It is also possible to use a screen f using 16 pixels as the smallest dot shaped such that some dots on its edges are omitted or a screen g using 18 pixels as the smallest dot in a shape with a stepped outline. It is also possible to use a screen h using 20 pixels as the smallest dot shaped such that some dots on its edges are omitted or a screen i using 24 pixels as the smallest dot in a shape with a stepped outline. It is also possible to use a screen j using 25 pixels as the smallest dot in a square shape. Further, it is possible to use a screen k using 26 pixels as the smallest dot shaped such that some dots on its edges are omitted or a screen l using 32 pixels as the smallest dot shaped such that some dots on its edges are omitted. It is also possible to use a screen m using 31 pixels as the smallest dot shaped such that some dots on its edges are omitted.

FIG. 16A is a diagram illustrating an example of a threshold matrix for usual AM screening tone reproduction in a case where the minimum dot size is seven dots. FIG. 16B is a diagram illustrating an example of a threshold matrix for screening tone reproduction according to this embodiment. Note that FIG. 16A and FIG. 16B illustrate examples in which each dot is in the shape of a rectangle with a rectangular protrusion thereon.

Also, FIG. 17A is a diagram illustrating an example of a threshold matrix for usual AM screening tone reproduction in a case where the minimum dot size is five dots. FIG. 17B is a diagram illustrating an example of a threshold matrix for screening tone reproduction according to this embodiment. Note that FIG. 17A and FIG. 17B illustrate examples in which each dot is in the shape of a crisscross.

Figure 18:
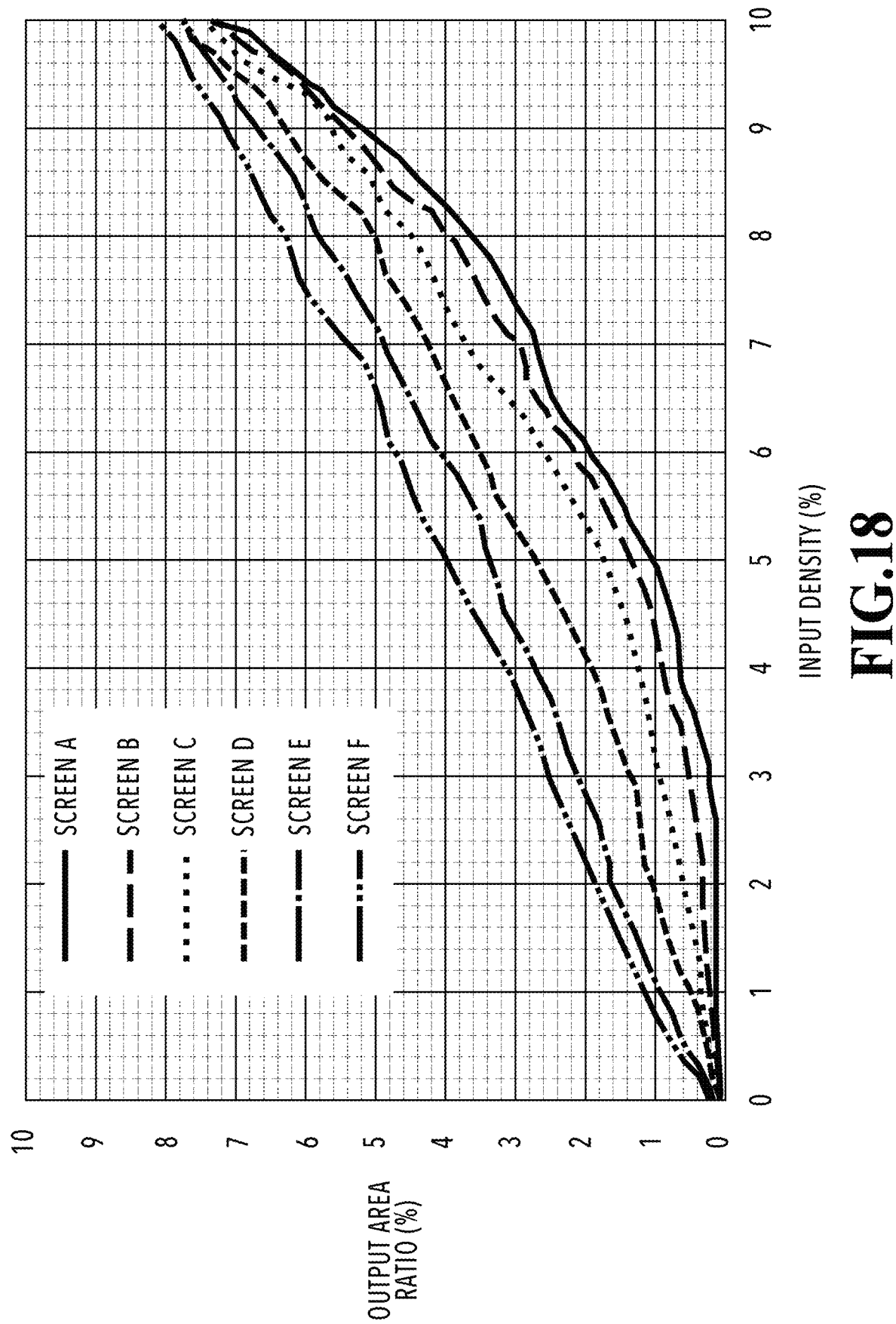
FIG. 18 is a diagram illustrating an example of the correlation between the input density and the halftone dot area ratio of each screen used in the embodiment.

FIG. 18 is a diagram illustrating an example of the correlation between the input density and the halftone dot area ratio of each screen used in the embodiment. FIG. 18 illustrates an example of the halftone dot area ratio within the input density range of 10% and below in a given environment in each of cases using the screens A to F, illustrated in FIG. 14.

The halftone dot area ratio is derived using the Murray-Davies equation, described as equation (3) below, in which an output patch's halftone dot density and solid density are compared.

$$\text{Halftone dot area ratio} = ((1-10^{-DT})/(1-10^{-DS})) \times 100 \text{ (\%)} \qquad \text{Equation (3)}$$

In equation (3), Dt represents the density of a halftone dot region and DS represents the solid density.

Using the halftone dot area ratio of each screen in the environment with which the graph is obtained, the reproducibility (halftone dot reproducibility) of the output, indicated as the ratio of the halftone dot area ratio to the input area ratio (density), is derived by equation (4).

$$\text{Halftone dot reproducibility} = (\text{Halftone dot area ratio})/(\text{Input area ratio}) \times 100 (\%) \qquad \text{Equation (4)}$$

Here, in a case where the halftone dot reproducibility of each screen in a given output condition of the image forming apparatus 100 is figured out by the least squares method, the screen A is 20%, the screen B is 25%, the screen C is 35%. Further, the screen D is 50%, the screen E is 60%, and the screen F is 75%. These results indicate that, in the output condition with which this graph is obtained, the screens A and B are not suitable for tone reproduction whereas the screens C, D, E, and F are suitable for tone reproduction.

Further, the smaller the minimum size, the lower the visual noticeability of a dot and thus the lower the visual noticeability of the screen structure. For this reason, the smallest dot is desirably as small as possible. Then, given such conditions, the most suitable screen that can be used can be selected between the screen C and the screen D, and the screen C (with a halftone dot reproducibility of 35% or higher), which is smaller in minimum dot size than the screen D), is selected.

FIG. 19 is a diagram illustrating an example of the result of evaluation on images with different minimum dot sizes in this embodiment, which is the result of visual evaluation on halftone images made in the environment with which the graph in FIG. 18 is created.

As illustrated FIG. 19, it can be seen that the screens C and D are evaluated to have neither roughness (noise), noticeable dots, nor false contours. In this embodiment, the image forming apparatus 100 stores, as data, reproducibility data on a plurality of minimum dot sizes as above in association with the output environments (temperature, humidity) for the image forming apparatus and the total number of sheets outputted, and is configured to use it to automatically select screens. In other words, the image forming apparatus 100 stores, as data, screens containing a plurality of patterns of fixed minimum dot sizes.

<Halftone Character>

Figure 20A:
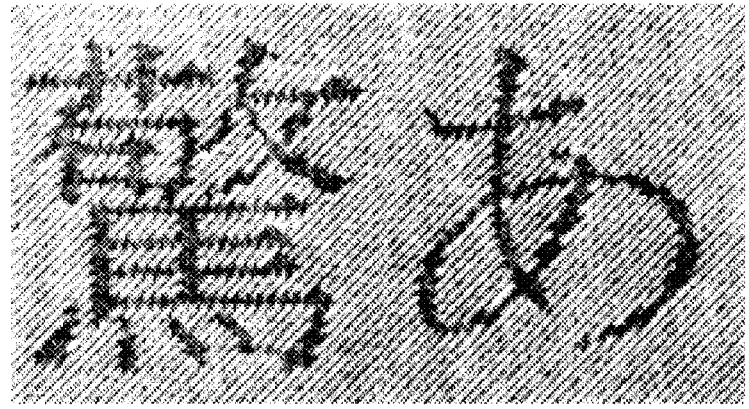
FIG. 20A and FIG. 20B are diagrams illustrating examples of images obtained by screen switching based on attribute information on each object.
Figure 20B:
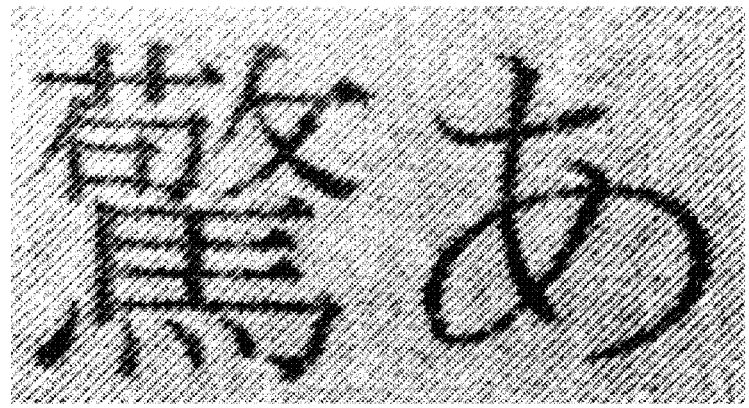

FIG. 20A is a diagram illustrating an image obtained by using different screens for an image region and a text region. FIG. 20B is a diagram illustrating an image obtained by using the same screen for the image region and the text region.

In conventional practices, as illustrated in FIG. 20A, different screens are used for image regions and text regions, and the difference in type of screen deteriorates the image quality. Thus, to eliminate such deterioration in image quality, in this embodiment, the image forming apparatus 100 is configured to use a screen with the same number of screen lines and the same angle for the image region and the text region in the image, as illustrated in FIG. 20B. In this embodiment, the image forming apparatus 100 uses dot screens in which the number of screen lines and the angle are 190 lpi and 18° for Cy, 190 lpi and 162° for M, 240 lpi and 0° for Y, and 212 lpi and 45° for Bk.

Also, in this embodiment, the image forming apparatus 100 uses screens with a specified minimum dot size in order to improve the reproducibility and stability of highlight regions. For example, as illustrated in FIG. 21A, the image forming apparatus 100 uses screens expressing tones by means of the number of dots.

This improves the stability and reproducibility of highlight and, in a case where an image region contains a halftone character, reduces problems such as whiting, mixing of colors, and formation of jaggies at the character's edge due to color misregistration or the like.

However, in the case of expressing the density of a halftone character or a colored character, there is a possibility that the character after the dither processing on its input character data miss some dots on its edge, as illustrated in FIG. 22. Also, even in a case where an outlining process is performed, there is a possibility that the visual recognizability may be deteriorated by uneven distribution of dots inside the character.

For this reason, in this embodiment, the image forming apparatus 100 is further configured to change the process for a highlight region, if any, in the screen to be used, on the basis of the attribute information on each object held in the image data inputted into the controller 150. Specifically, in this embodiment, for an object having the text attribute, the image forming apparatus 100 does not use a dot concentration-type screen with a specified minimum dot size but uses a non-dot concentration-type screen having the same number of lines and the same angle, as illustrated in FIG. 21B. To sum up, screens having a common number of screen lines are used as dot concentration-type screens, which are selected for the image attribute and the vector attribute, and non-dot concentration-type screens, which are selected for the text attribute. Dot concentration-type and non-dot concentration-type screens preferably have a common number of screen lines for each color and more preferably have a common number of screen lines and a common angle for each color. Moreover, dot concentration-type and non-dot concentration-type screens even more preferably have the same number of screen lines and the same angle for each color.

<Sequence of Process>

Figure 23:
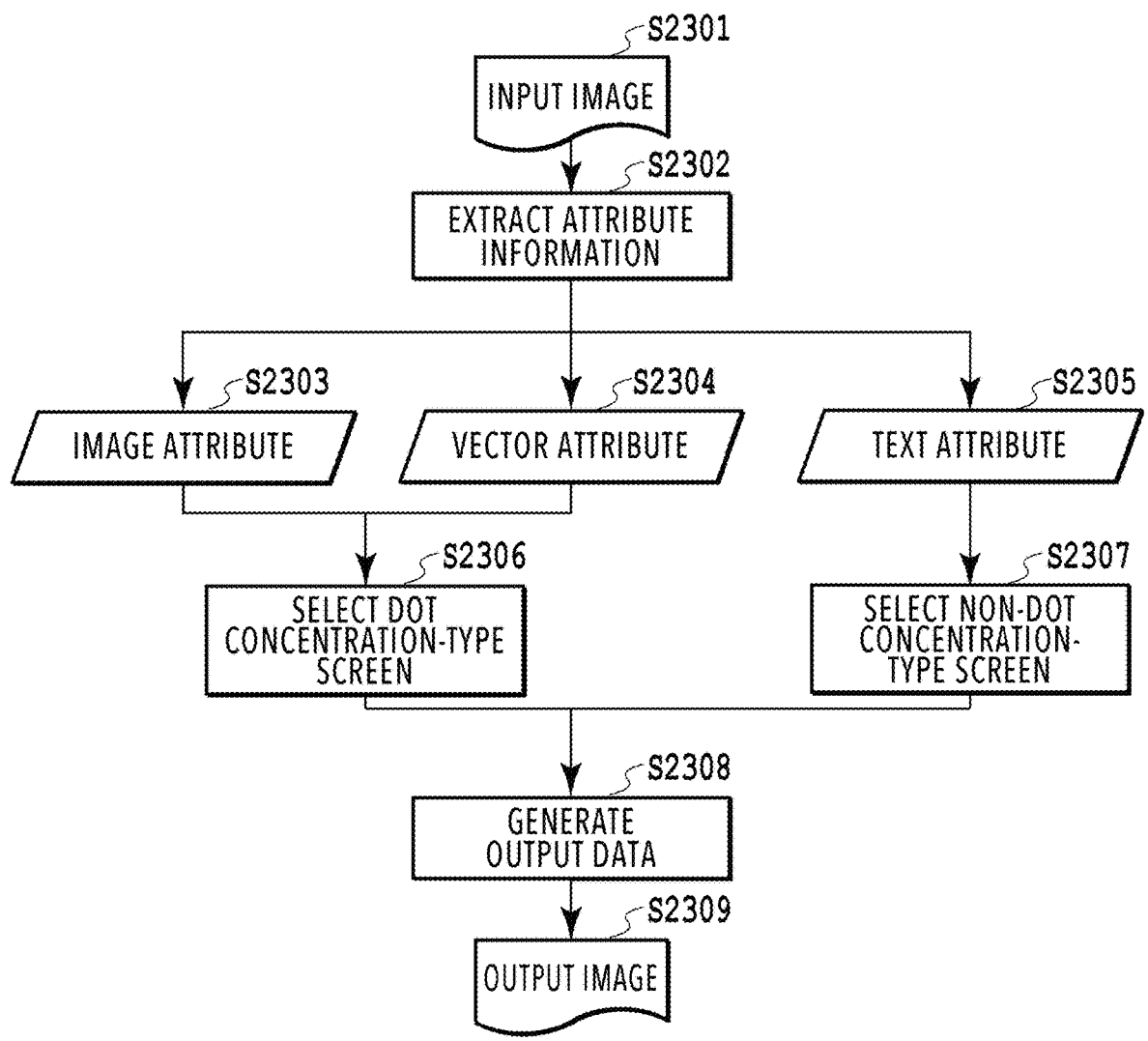
FIG. 23 is a flowchart illustrating the sequence of an image forming process.

FIG. 23 is a flowchart illustrating the sequence of the image forming process by the image forming apparatus 100.

Description will be given of the sequence of the image forming process including the screen switching process with reference to FIG. 23. The CPU 105 implements the process in the flowchart to be described below by, for example, reading out a program stored in the ROM 107 or the storage unit 108 into the RAM 106 and executing it. The symbol S as used herein refers to a step in the flowchart.

First, in S2301, the controller 150 receives input image data. Specifically, the CPU 105 of the controller 150 obtains the input image data.

In S2302, the CPU 105 of the controller 150 extracts the attribute information on each object in the input image data. Specifically, the CPU 105 extracts the attribute information on each object in the obtained input image data on a pixel-by-pixel basis. The attribute information on each object is one of three types, namely, image attribute, vector attribute, and text attribute, as mentioned above.

In S2303 to S2305, the CPU 105 of the controller 150 categorizes each object on the basis of the attribute information, extracted on a pixel-by-pixel basis. The CPU 105 then selects a screen in accordance with the attribute information on the object (S2306, S2307). The printer image processing unit 119 is notified of the selected screen. The CPU 105 generates output data by using the selected screen(s) (S2308) and outputs the image (S2309) in cooperation with the printer image processing unit 119.

Specifically, the controller 150 proceeds to the process in S2306 in a case where the attribute information, extracted on a pixel-by-pixel basis, indicates that the object has the image attribute (S2303) or the vector attribute (S2304). Then, the controller 150 selects the dither processing using a dot concentration-type screen. Thereafter, the controller 150 generates output data by using the dot concentration-type screen (S2308) and outputs the image (S2309).

On the other hand, the controller 150 proceeds to the process in S2307 in a case where the attribute information, extracted on a pixel-by-pixel basis, indicates that the object has the text attribute. Then, the controller 150 selects a highlight screen for text (non-dot concentration-type screen) (S2307). Thereafter, the controller 150 generates output data by using the non-dot concentration-type screen (S2308) and outputs the image (S2309).

In this embodiment, a case where the CPU 105 mainly serves to implement the processes in the flowchart in FIG. 23 has been exemplarily presented. Note, however, that the present invention is not limited to this case. The CPU 105 and the printer image processing unit 119, which is implemented with an ASIC or the like, may cooperate with each other to implement the processes.

Specifically, a processor such as the CPU 105 can implement the pixel-by-pixel attribute extraction in S2302 to S2305 while the printer image processing unit 119, implemented with a hardware circuit such as an ASIC, can implement the output data generation process, which corresponds S2306 to S2308, selectively using a suitable screen(s).

Using its hardware circuit, the printer image processing unit 119 executes the dither processing using a dot concentration-type screen and the dither processing using a non-dot concentration-type screen in parallel irrespective of the attributes in the input image. Then, when generating output data, the printer image processing unit 119 may select the data to be output on the basis of the attribute information. For example, in S2308, in a case where the attribute information on the target pixel indicates the image or vector attribute, the printer image processing unit 119 may select the halftone image processed with the dot concentration-type screen and, in a case where the attribute information on the target pixel indicates the text attribute, the printer image processing unit 119 may select the halftone image processed with the non-dot concentration-type screen.

Figure 24:
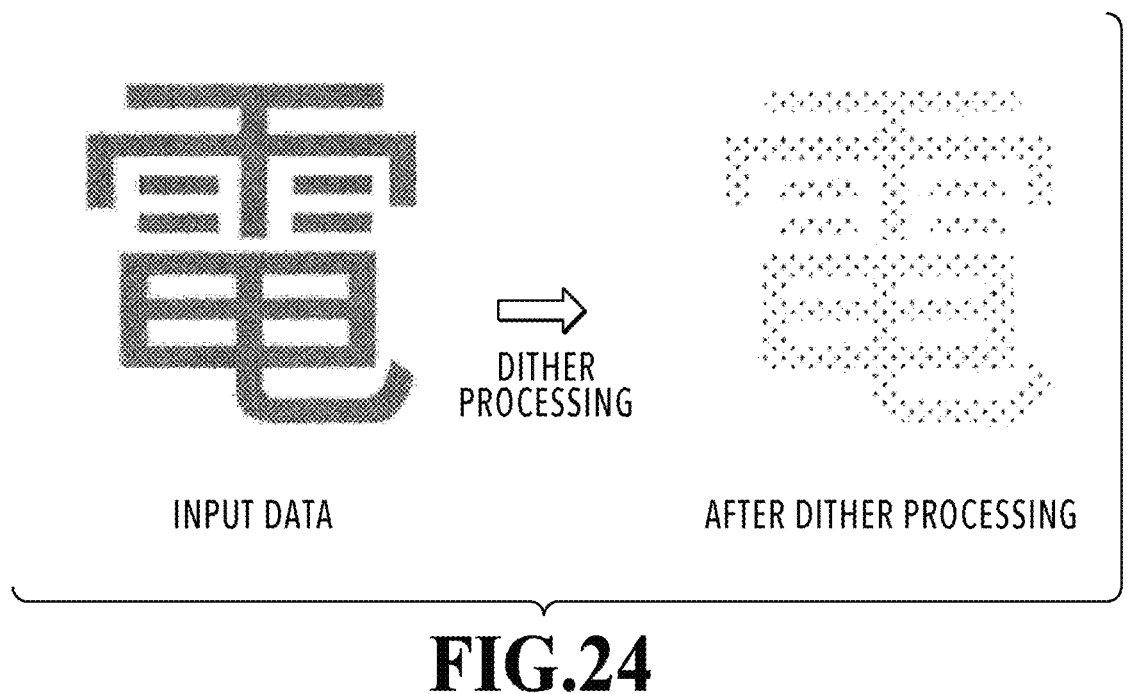
FIG. 24 is diagram illustrating an example of a halftone character after dither processing in the embodiment.

By the above process, a halftone character, which would undergo dither processing as illustrated in FIG. 20A with a dot concentration-type screen with a specified minimum dot size, undergoes dither processing as illustrated in FIG. 24. This enables improvement in visual recognisability.

As described above, in the case of expressing the density of a halftone character or a colored character, performing the processes in S2301 to S2309 in FIG. 23 eliminates the possibility that the character after the dither processing on its input character data miss some dots on its edge. Also, even in the case where an outlining process is performed, performing the processes in S2301 to S2309 in FIG. 23 prevents uneven distribution of dots inside the character and suppresses deterioration in visual recognisability originating from the dot distribution. To sum up, performing the processes in S2301 to S2309 in FIG. 23 improves the reproducibility and stability of halftones in highlight regions.

OTHER EMBODIMENTS

In the above embodiment, the description has given of a process for character regions. However, the present invention is also applicable to objects such as lines and figures on the basis of the attribute information.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to this embodiment, it is possible to improve the reproducibility and stability of halftones in highlight regions.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-060902, filed Mar. 27, 2018, which is hereby incorporated by reference wherein in its entirety.

What is claimed is:

1. An image forming apparatus that performs image formation by transferring and fixing an image formed on an image carrier onto a sheet, comprising:
   a memory storing a first threshold matrix and a second threshold matrix for executing a halftone process that converts multi-tone input image data into output image data containing a smaller number of tones than the input image data; and
   a controller unit including a processor or a hardware circuit configured to execute a program,
   wherein the controller unit functions as an output unit configured to output output image data obtained by the halftone process with the first threshold matrix in a case where attribute information associated with pixels of the input image data is a first type, and to output output image data obtained by the halftone process with the second threshold matrix in a case where the attribute information associated with the pixels of the input image data is a second type,
   wherein in the first threshold matrix, thresholds are arranged to express a tone level of output image data by means of the number of dots of a first size for input image data with a first density and also thresholds are arranged to express a tone level of output image data by means of dot area modulation for input image data with a second density higher than the first density,
   wherein in the second threshold matrix, thresholds are arranged to express a tone level of output image data by means of dot area modulation for both input image data with the first density and input image data with the second density, and
   wherein the thresholds in the first threshold matrix and the second threshold matrix are arranged such that an average dot size of output image data obtained by performing the halftone process with the second threshold matrix on input image data with the first density is smaller than an average dot size of output image data obtained by performing the halftone process with the first threshold matrix on the input image data with the first density.

2. The image forming apparatus according to claim 1, wherein the thresholds in the first threshold matrix and the second threshold matrix are arranged such that output image data outputted as a result of performing the halftone process with the first threshold matrix on input image data with a predetermined density and output image data outputted as a result of performing the halftone process with the second threshold matrix on the input image data with the predetermined density have a common number of screen lines.

3. The image forming apparatus according to claim 2, wherein the thresholds in the first threshold matrix and the second threshold matrix are arranged such that output image data outputted as a result of performing the halftone process with the first threshold matrix on input image data with a predetermined density and output image data outputted as a result of performing the halftone process with the second threshold matrix on the input image data with the predetermined density have a common screen angle.

4. The image forming apparatus according to claim 1, wherein the attribute information of the first type includes a text attribute, and the attribute information of the second type includes an image attribute.

5. The image forming apparatus according to claim 4, wherein the dots of the first size are dots of a size with which halftone dot reproducibility is 35% or higher, the halftone dot reproducibility representing a ratio of a halftone dot area ratio to an input area ratio.

6. The image forming apparatus according to claim 5, wherein the halftone dot area ratio is derived on a basis of equation (B) below $$\text{Halftone dot area ratio} = ((1-10^{(-DT)})/(1-10^{(-DS)}) \times 100(\%) \quad \text{Equation (B)}$$

where DT represents density of a halftone dot region, and DS represents solid density.

7. The image forming apparatus according to claim 1, wherein thresholds for performing amplitude modulated screening are arranged in the second threshold matrix.

8. The image forming apparatus according to claim 1, further comprising a printing device,
   wherein the controller unit further functions as a control unit configured to transmit output image data outputted by the output unit to the printing device and cause the printing device to perform image formation by transferring and fixing an image based on the output image data onto a sheet.

9. An image forming method for an image forming apparatus that performs image formation by transferring and fixing an image formed on an image carrier onto a sheet, comprising:
   outputting output image data converted from multi-tone input image data by a halftone process with a first threshold matrix in a case where attribute information associated with pixels of the multi-tone input image data is a first type, the output image data containing a smaller number of tones than the input image data; and
   outputting output image data converted from the multi-tone input image data by a halftone process with a second threshold matrix in a case where the attribute information associated with the pixels of the multi-tone input image data is a second type, the output image data containing a smaller number of tones than the input image data,
   wherein in the first threshold matrix, thresholds are arranged to express a tone level of output image data by means of the number of dots of a first size for input image data with a first density and also thresholds are arranged to express a tone level of output image data by means of dot area modulation for input image data with a second density higher than the first density,
   wherein in the second threshold matrix, thresholds are arranged to express a tone level of output image data by means of dot area modulation for both input image data with the first density and input image data with the second density, and
   wherein the thresholds in the first threshold matrix and the second threshold matrix are arranged such that an average dot size of output image data obtained by performing the halftone process with the second threshold matrix on input image data with the first density is smaller than an average dot size of output image data obtained by performing the halftone process with the first threshold matrix on the input image data with the first density.

10. The image forming method according to claim 9, wherein the thresholds in the first threshold matrix and the second threshold matrix are arranged such that output image data outputted as a result of performing the halftone process with the first threshold matrix on input image data with a predetermined density and output image data outputted as a result of performing the halftone process with the second threshold matrix on the input image data with the predetermined density have a common number of screen lines.

11. The image forming method according to claim 10, wherein the thresholds in the first threshold matrix and the second threshold matrix are arranged such that output image data outputted as a result of performing the halftone process with the first threshold matrix on input image data with a predetermined density and output image data outputted as a result of performing the halftone process with the second threshold matrix on the input image data with the predetermined density have a common screen angle.

12. The image forming method according to claim 9, wherein the attribute information of the first type includes a text attribute, and the attribute information of the second type includes an image attribute.

13. The image forming method according to claim 12, wherein the dots of the first size are dots of a size with which halftone dot reproducibility is 35% or higher, the halftone dot reproducibility representing a ratio of a halftone dot area ratio to an input area ratio.

14. The image forming method according to claim 13, wherein the halftone dot area ratio is derived on a basis of equation (B) below $$\text{Halftone dot area ratio} = ((1-10^{(-DT)})/(1-10^{(\times DS)})) \times 100 (\%) \qquad \text{Equation (B)}$$

where DT represents density of a halftone dot region, and DS represents solid density.

15. The image forming method according to claim 9, wherein thresholds for performing amplitude modulated screening are arranged in the second threshold matrix.

16. A non-transitory computer readable storage medium storing a program for causing a computer to perform an image forming method for an image forming apparatus that performs image formation by transferring and fixing an image formed on an image carrier onto a sheet, the method comprising the steps of:

outputting output image data converted from multi-tone input image data by a halftone process with a first threshold matrix in a case where attribute information associated with pixels of the multi-tone input image data is a first type, the output image data containing a smaller number of tones than the input image data; and outputting output image data converted from the multi-tone input image data by a halftone process with a second threshold matrix in a case where the attribute information associated with the pixels of the multi-tone input image data is a second type, the output image data containing a smaller number of tones than the input image data, wherein in the first threshold matrix, thresholds are arranged to express a tone level of output image data by means of the number of dots of a first size for input image data with a first density and also thresholds are arranged to express a tone level of output image data by means of dot area modulation for input image data with a second density higher than the first density, wherein in the second threshold matrix, thresholds are arranged to express a tone level of output image data by means of dot area modulation for both input image data with the first density and input image data with the second density, and wherein the thresholds in the first threshold matrix and the second threshold matrix are arranged such that an average dot size of output image data obtained by performing the halftone process with the second threshold matrix on input image data with the first density is smaller than an average dot size of output image data obtained by performing the halftone process with the first threshold matrix on the input image data with the first density.

* * * * *